US012783438B1

(12) United States Patent
Soloveychik

(10) Patent No.: US 12,783,438 B1
(45) Date of Patent: Nov. 3, 2026

(54) METHOD AND APPARATUS FOR STATIC WEIGHT PERMUTATION IN TRANSFORMER WORKLOADS

(71) Applicant: d-MATRIX CORPORATION, Santa Clara, CA (US)

(72) Inventor: Ilya Soloveychik, Santa Clara, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 43 days.

(21) Appl. No.: 18/927,483

(22) Filed: Oct. 25, 2024

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ...................................................... G06F 7/5443
See application file for complete search history.

(56) References Cited

U.S. PATENT DOCUMENTS

2021/0390127 A1* 12/2021 Fox .......................... G06F 16/35
2023/0058355 A1 2/2023 Hornung et al.
2023/0168899 A1* 6/2023 Bhoja ................... G06F 9/3836 712/22

OTHER PUBLICATIONS

Rotation and Permutation for Advanced Outlier Management and Efficient Quantization of LLMs (Year: 2024).*

* cited by examiner

*Primary Examiner* — Henry Tsai
*Assistant Examiner* — Juanito C Borromeo
(74) *Attorney, Agent, or Firm* — Ogawa P.C.

(57) ABSTRACT

A method of operating a transformer compute apparatus using weight permutations. The method includes performing a permutation process on both a target weight matrix known to have one or more outlier values and a matching permutation process on an associated weight matrix of a target workload operation. This target weight matrix can be permuted across a quantization dimension according to its vector norms in ascending or descending order. To preserve the output of the operation, the other weight matrix is permuted to match the permutation of the target weight matrix, as the synchronized permutation of both weight matrices will result in the same product of those matrices. The synchronized permutation of both matrices reduces the variance of the resulting output, which also reduces variance of the elements within each quantized unit of the resulting output in the quantization format and thus mitigates the impact of the outlier values.

74 Claims, 21 Drawing Sheets

METHOD AND APPARATUS FOR STATIC WEIGHT PERMUTATION IN TRANSFORMER WORKLOADS

CROSS-REFERENCES TO RELATED APPLICATIONS

N/A

BACKGROUND OF THE INVENTION

The present invention relates generally to integrated circuit (IC) devices and artificial intelligence (AI). More specifically, the present invention relates to methods and device structures for accelerating computing workloads, such as those in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and methods to accelerate compute workloads for AI are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads, such as those in transformer-based neural network models (a.k.a. transformers) and the like. These methods and structures can be used in machine/deep learning applications such as natural language processing (NLP), computer vision (CV), and the like. Merely by way of example, the invention has been applied to AI accelerator apparatuses and chiplet devices configured in a PCIe card.

According to an example, the present invention provides for a method of operating a transformer compute apparatus to process a transformer workload using weight permutation. The method includes performing a permutation process on a target weight matrix known to have one or more outlier values and a matching permutation process on an associated weight matrix of a target workload operation. In an example, the target weight matrix is chosen as one whose result should be quantized into a lower precision format. This target weight matrix is permuted along a chosen dimension (e.g., row or column) according to its vector norms in ascending or descending order. In a specific example, the chosen dimension is along the quantization dimension of the operation result or of an intermediate result.

To preserve the output of the operation, the other weight matrix in the operation is permuted afterwards to match the permutation of the target weight matrix, as the synchronized permutation of both weight matrices will result in the same product of those matrices or the same product of intermediate matrix multiplication results using those matrices. Also, in operations that include rotary positional embeddings (RoPE) matrices, the RoPE matrix can be permuted in an element-wise product implementation, which can be applied to the permuted weight matrices in the operation to preserve the output. Further, operations with a nonlinearity function between two linear layer sub-operations, each including one of the weight matrices, do not require additional adjustments to preserve the output because the nonlinearities are invariant under permutation of the inputs.

The synchronized permutation of both matrices (i.e., a permutation process on the target weight matrix and a matching permutation process on the associated weight matrix) reduces the vector norm variance between the dimension units (e.g., rows or columns) of the permutated target weight matrix, which also reduces the variance between elements of the resulting output. And by reducing the variance of the elements of the output, this method also reduces variance of the elements within each quantized unit (e.g., block) of the resulting output in the quantization format (e.g., BFP format). This variance reduction mitigates the impact of outlier values (which results in suppression of smaller values) because the accuracy of each quantized unit can be maintained when the values within each such unit are relatively close together even if the distribution of all the values of the resulting output has a much greater range.

In an example, the weight permutation process can be performed by an external computing device that is coupled to a target workload processing hardware (e.g., transformer compute apparatus, chiplet device, AI accelerator apparatus, and the like). The permuted static weight matrices can then be sent to the target hardware to be used in processing the transformer workload. Afterwards, the target hardware computes the operations using the permuted static weight matrices, which mitigate the impact of any outliers on the accuracy of the quantized result.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
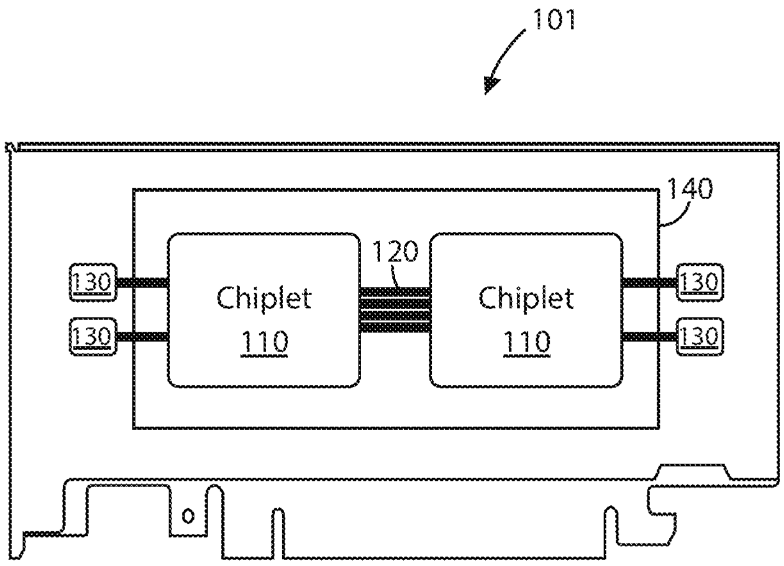
FIGS. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
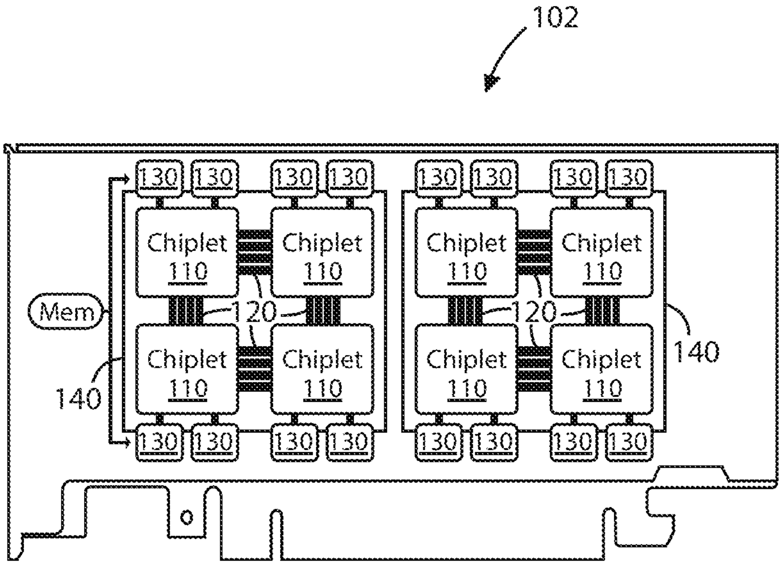

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel.

Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
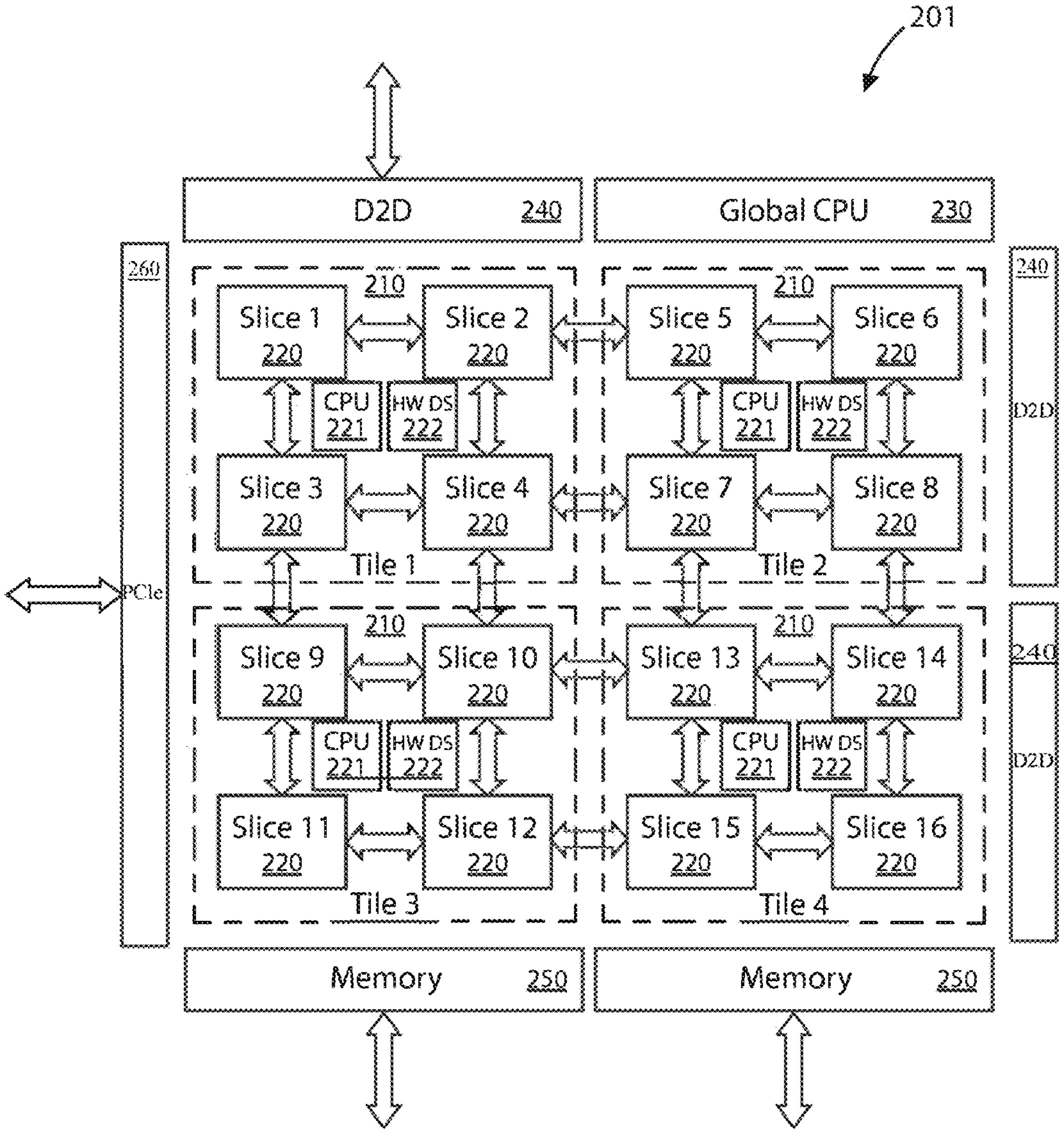
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
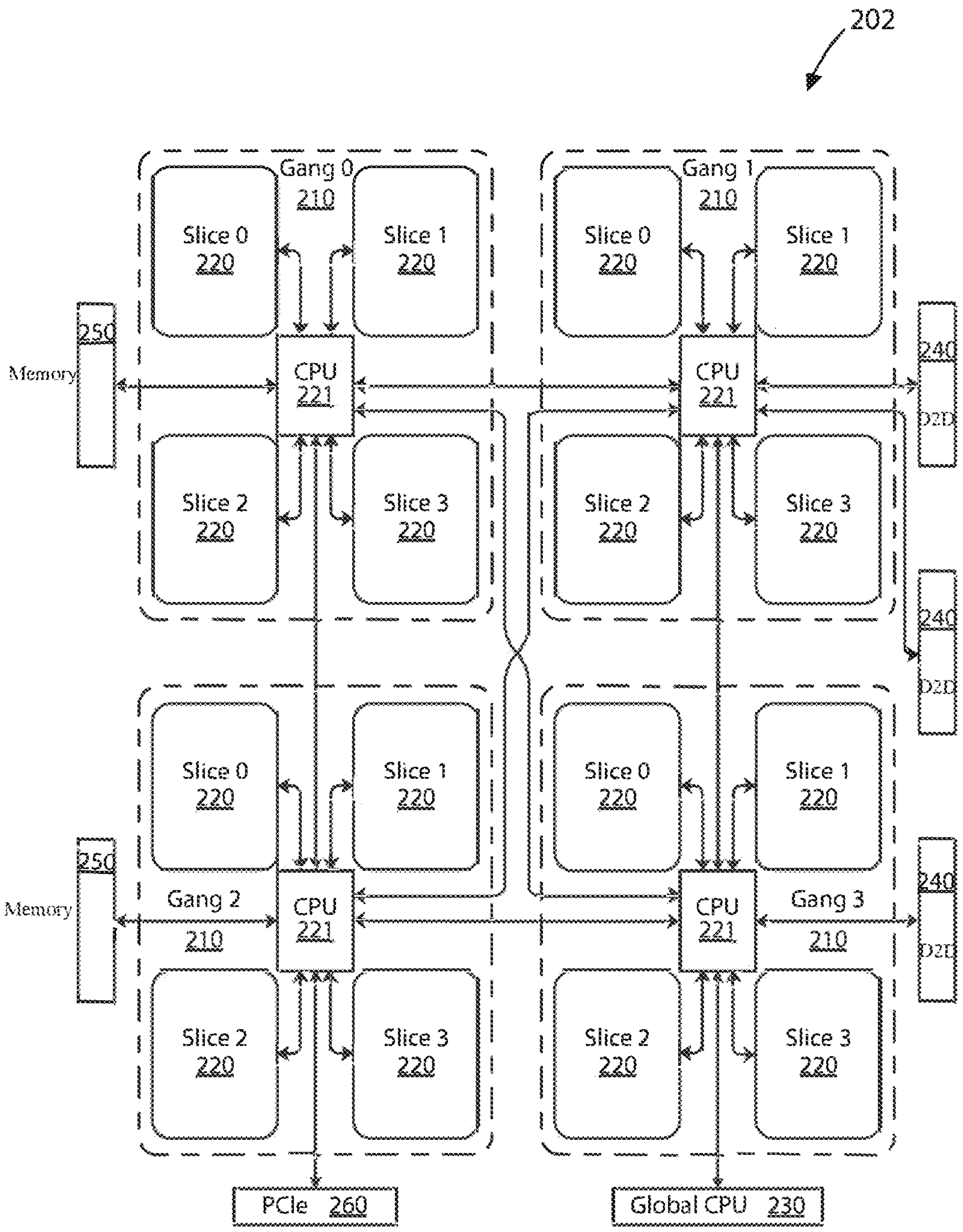

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
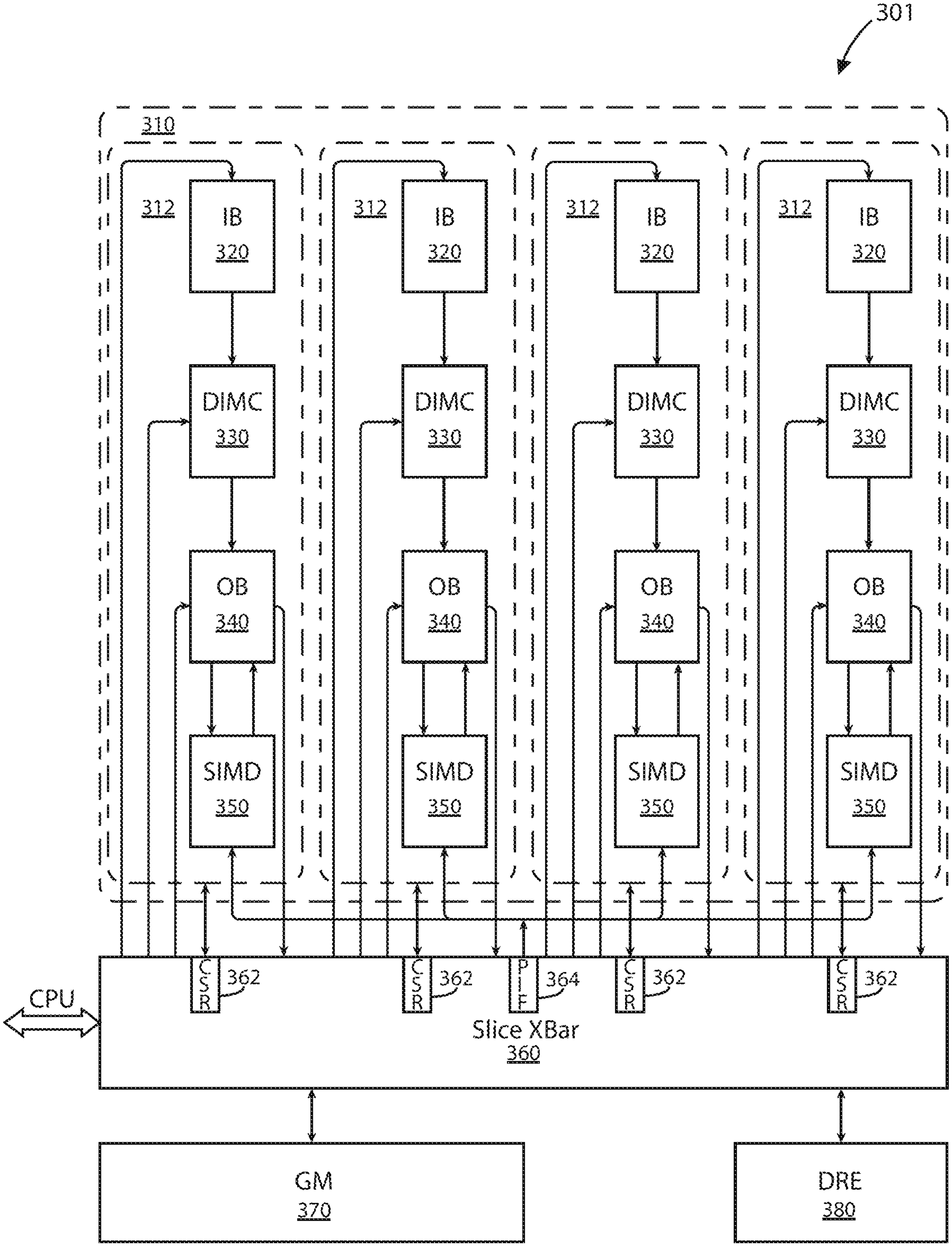
FIGS. 3A-3B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
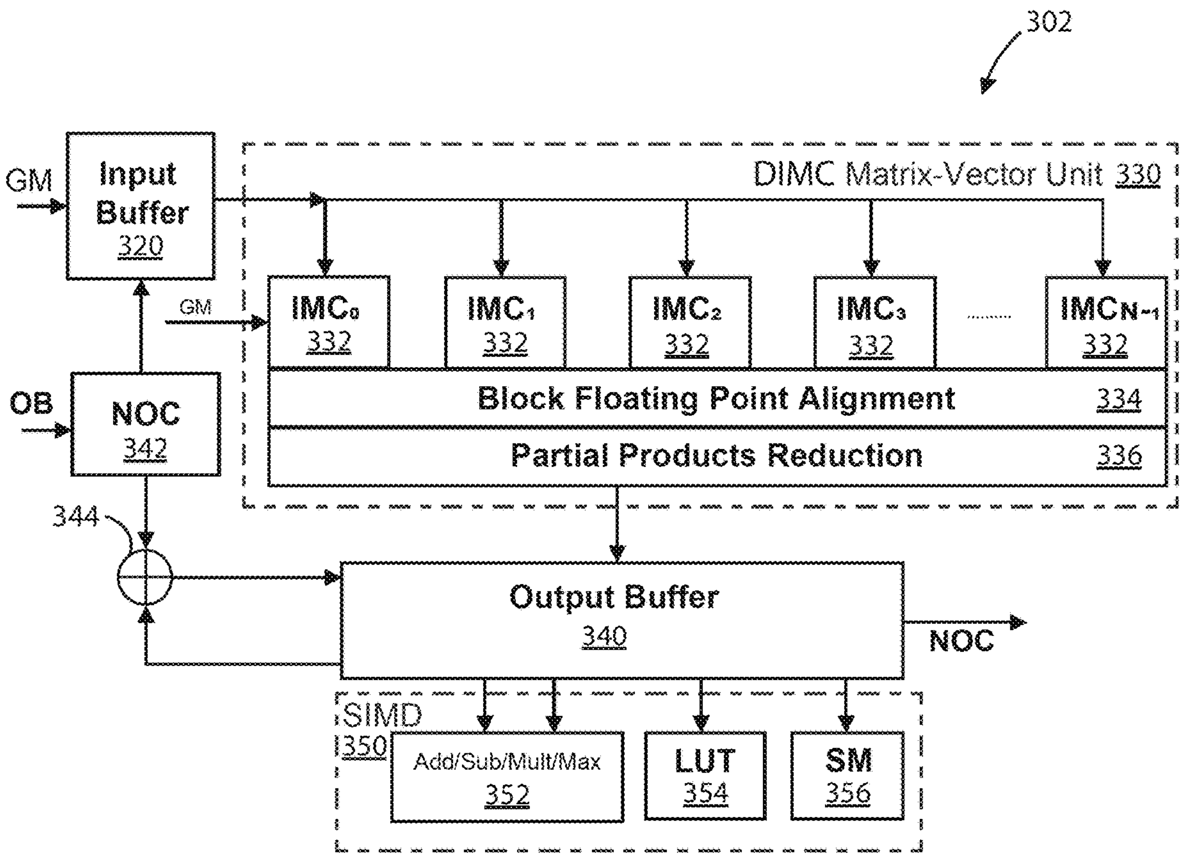

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can include a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations, as well as floating point computations, such as IEEE 854 float16 or float32. These slice components can vary depending on which transformer the AI accelerator apparatus will serve.

Figure 4:
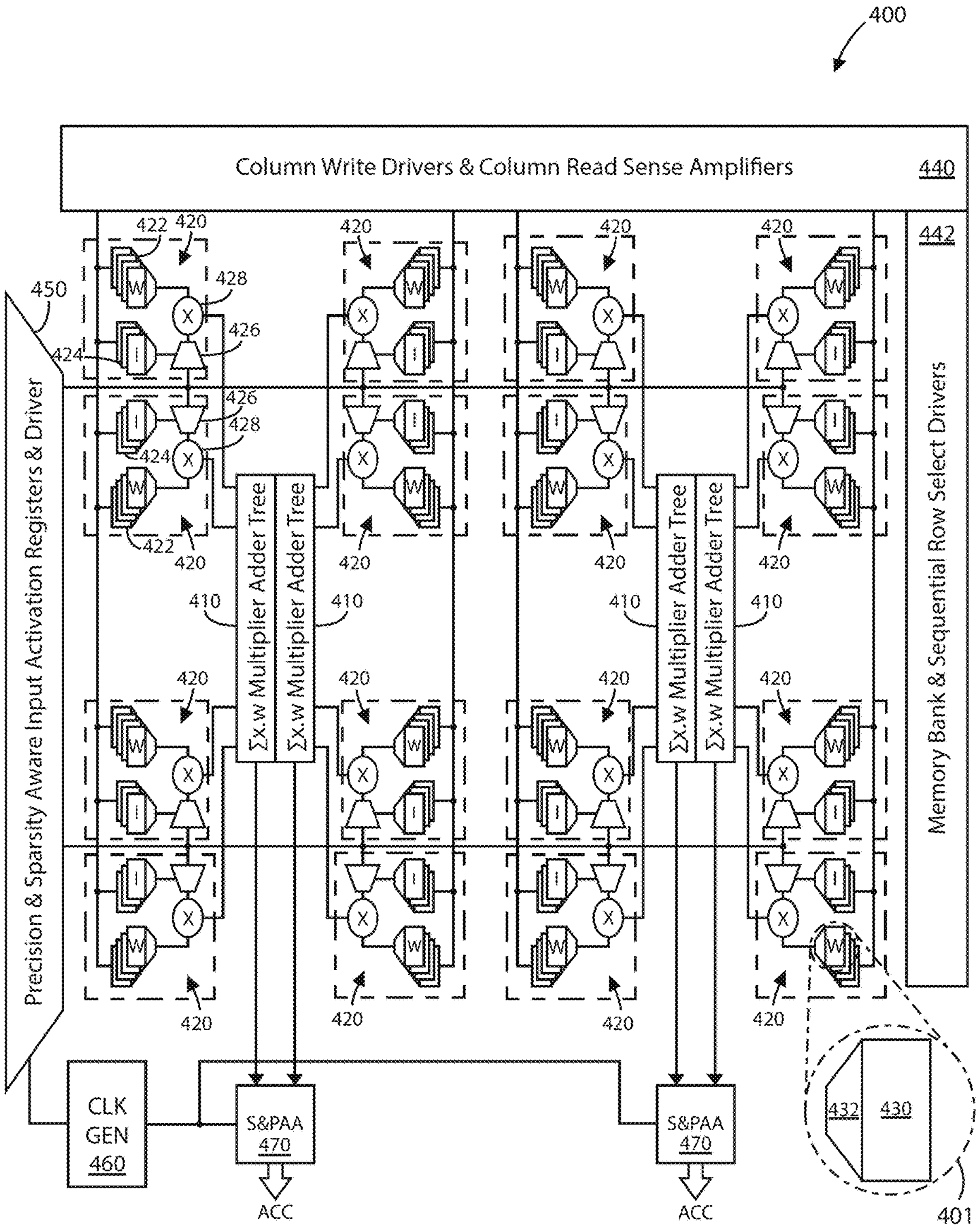
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., Σx·w).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

Figure 13A:
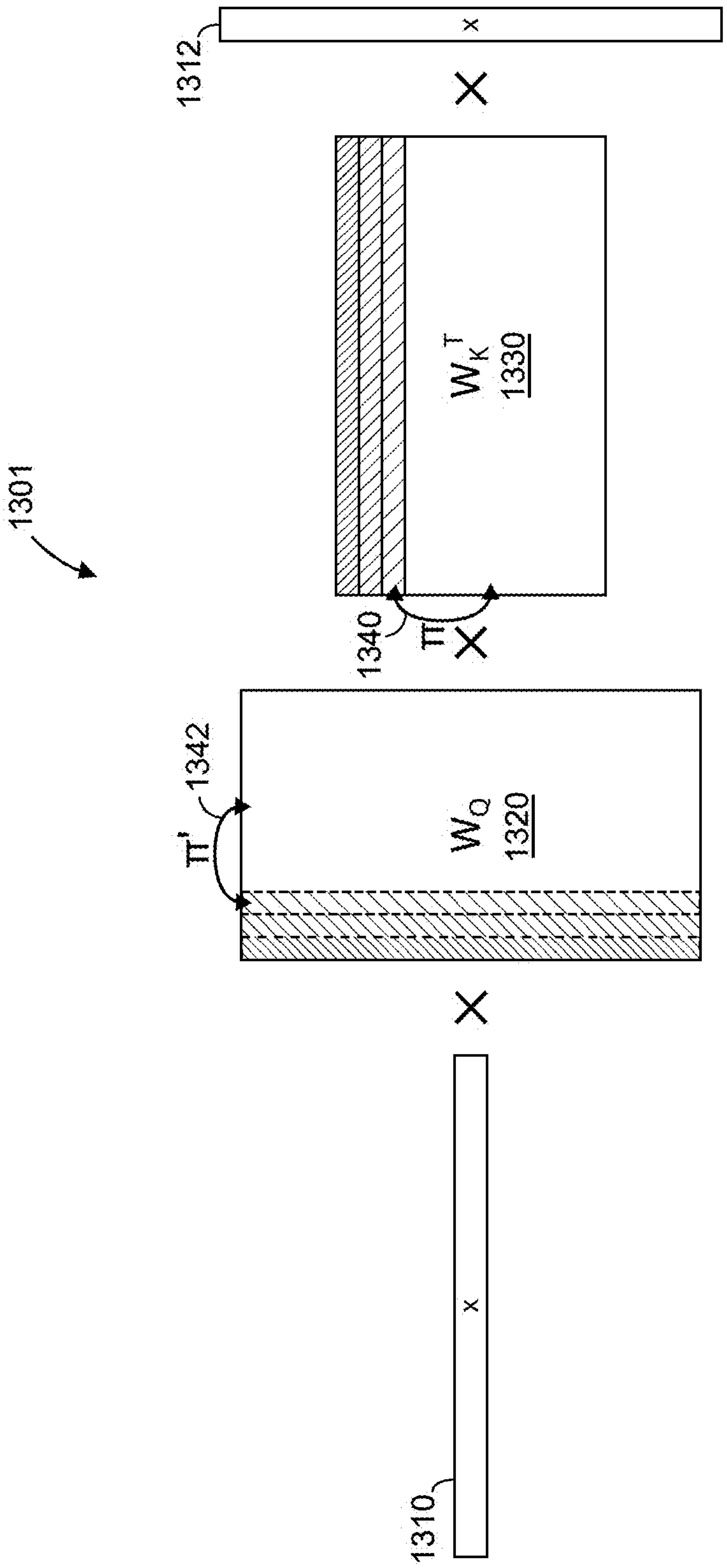
FIG. 13A is a simplified diagram illustrating a method of weight permutation applied to a self-attention score operation using query (Q) and key (K) tokens according to an example of the present invention.
Figure 13B:
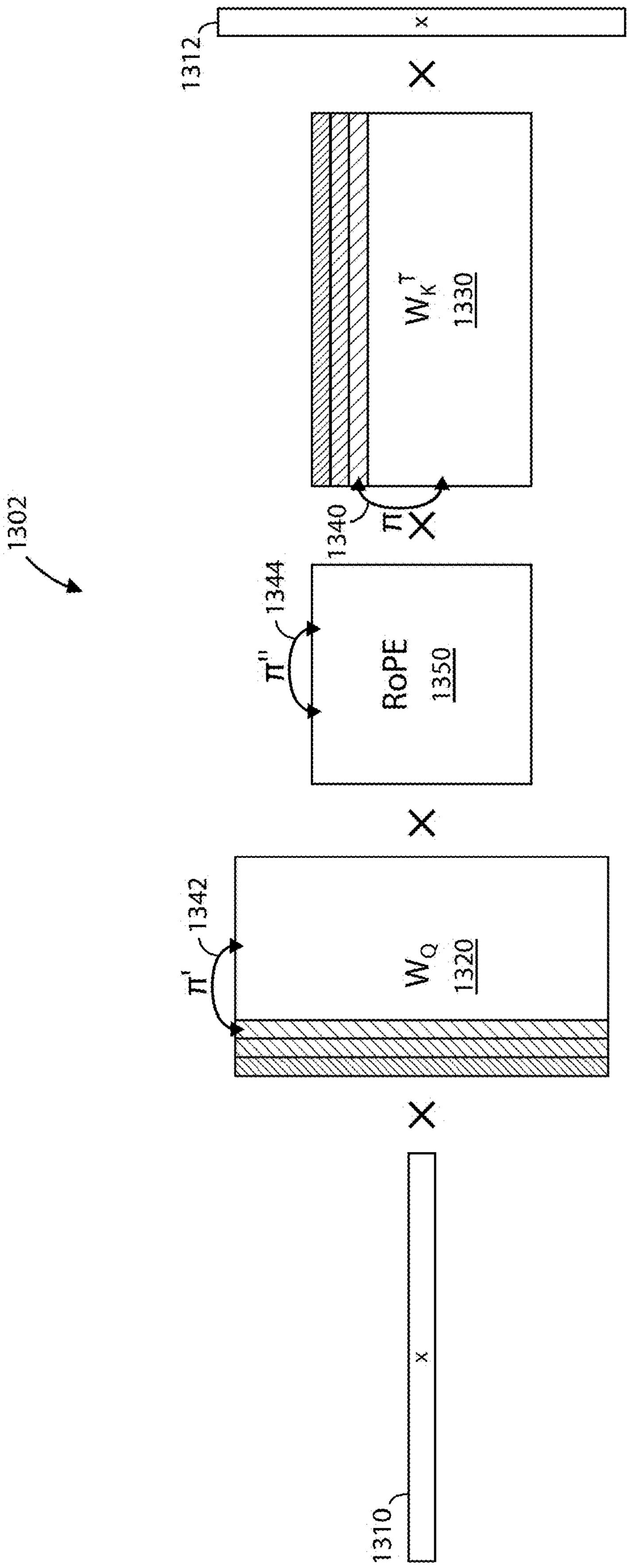
FIG. 13B is a simplified diagram illustrating a method of weight permutation applied to the self-attention score operation of FIG. 13A with a rotary position embedding (RoPE) according to an example of the present invention.

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
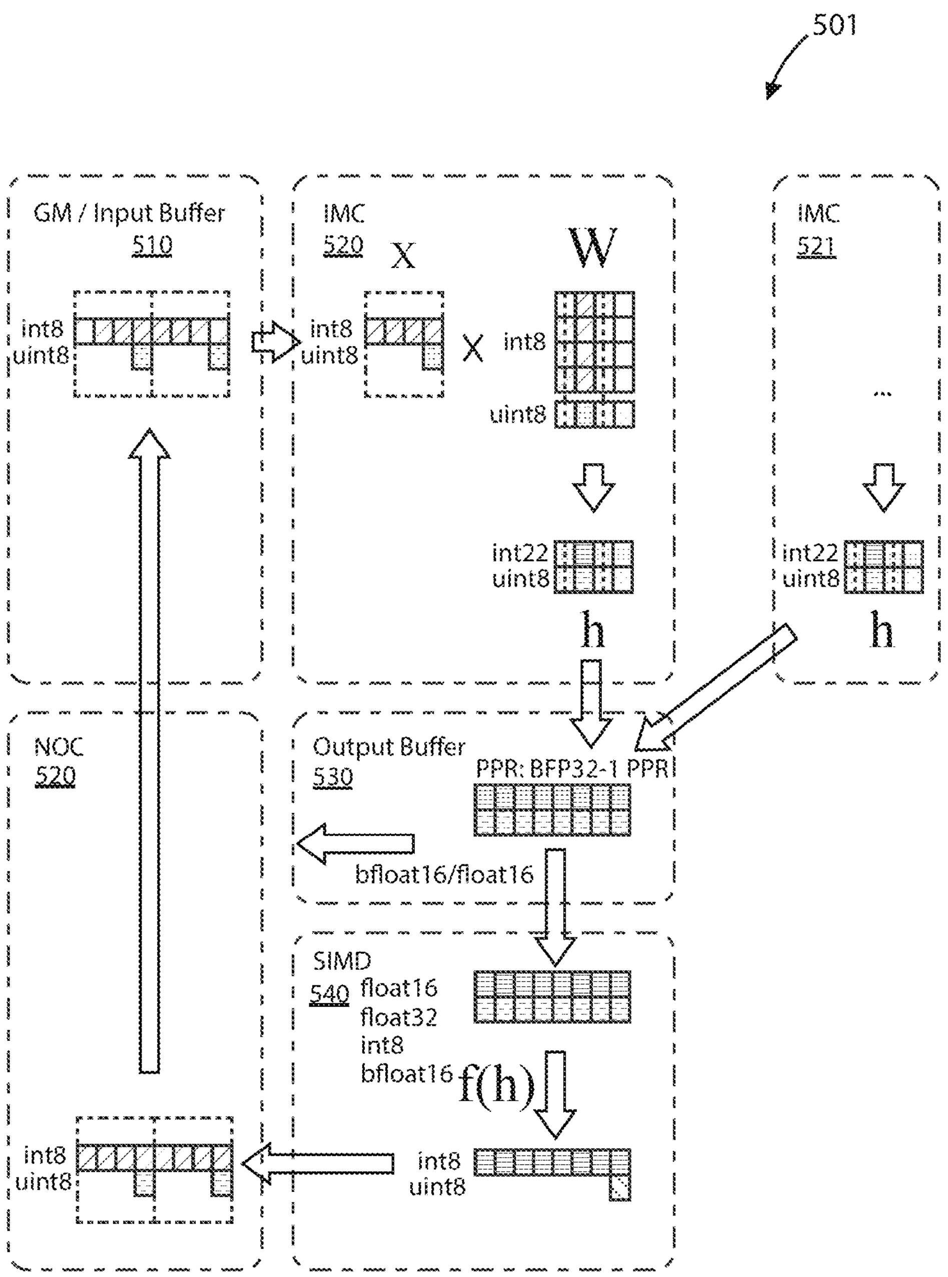
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation (Σx·w). Additionally, the format for the data from IMC 532 flows to the output buffer 530 as well. In this example, the numerical formats include integer (int), floating point (float), and block floating point (BFP) of varying lengths.

Figure 5B:
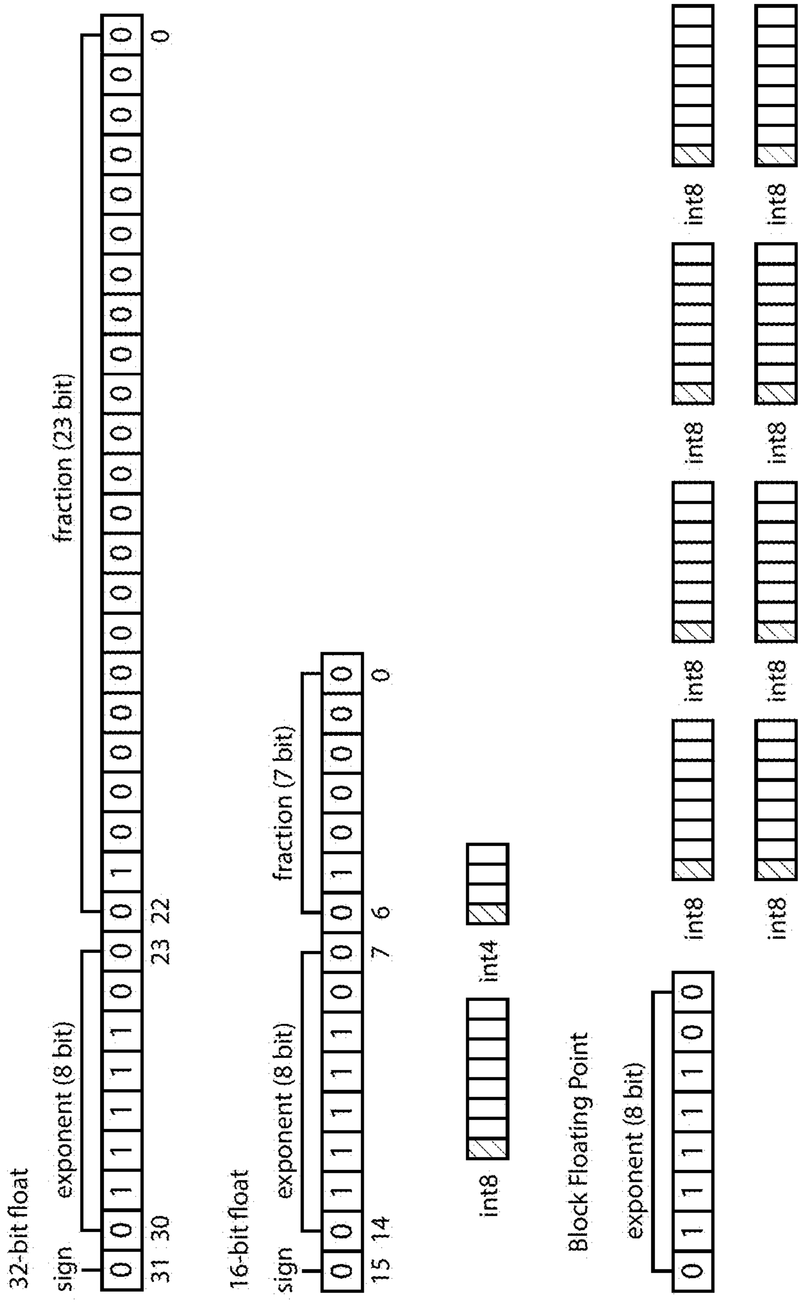
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for inference can exhibit the efficiency of fixed point without the accuracy and deployment problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6A:
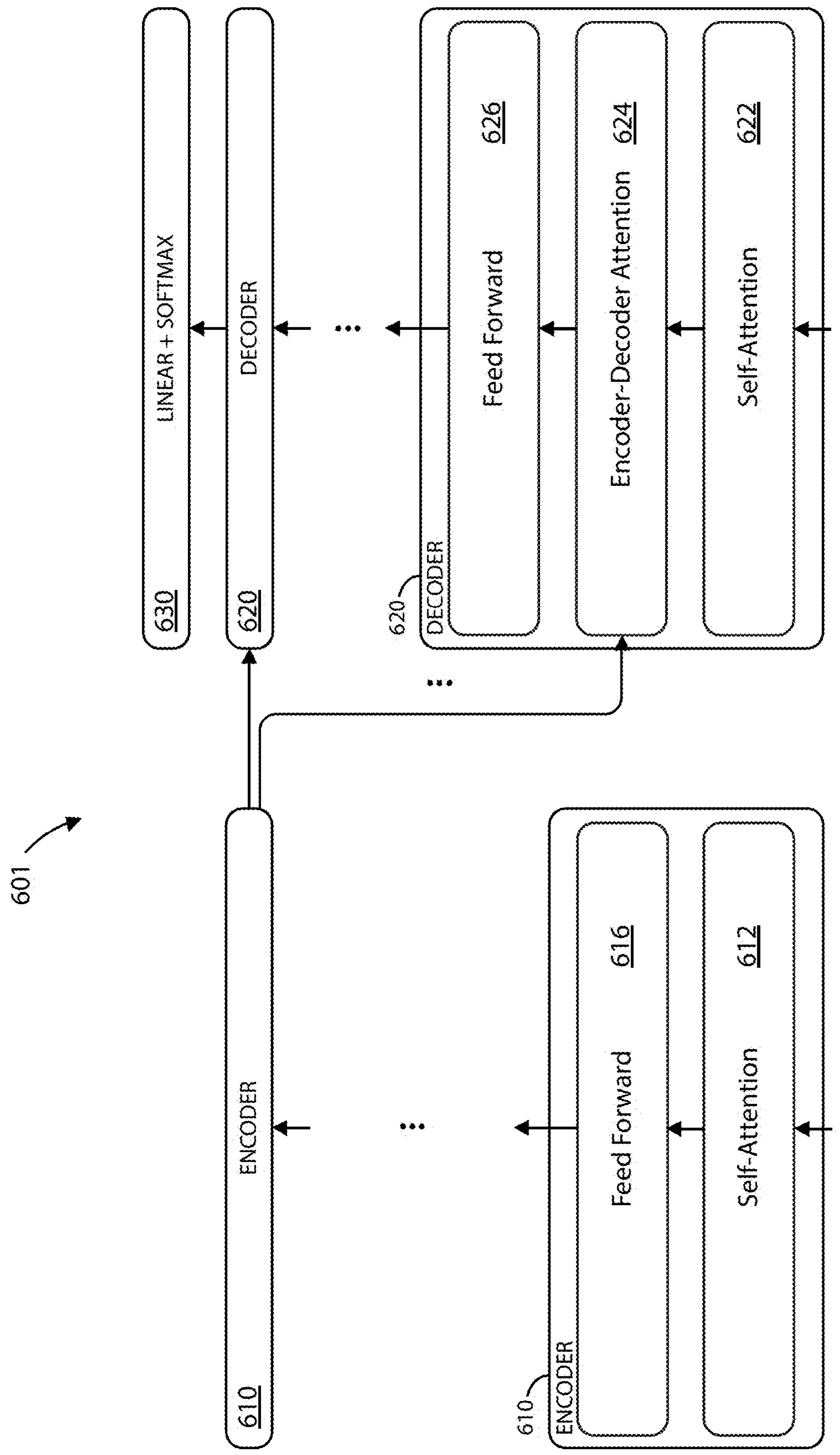
FIG. 6A is a simplified block diagram of a transformer architecture.

FIG. 6A illustrates a simplified transformer architecture 601. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 that uses the attention vectors from the encoder stack to aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the probability output, the projected word meaning may be chosen based on the highest probability or by other derived criteria depending on the application.

Figure 6B:
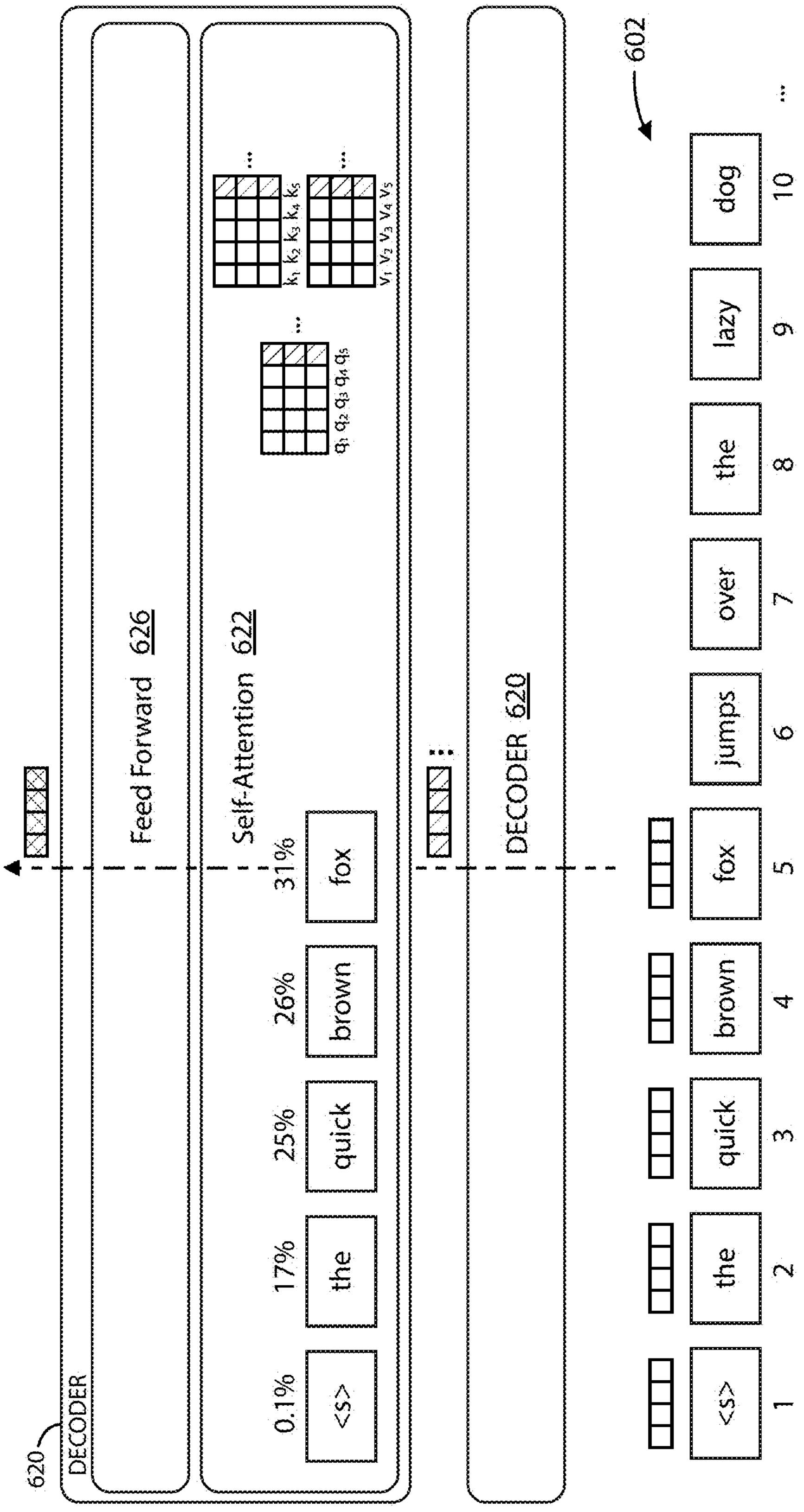
FIG. 6B is a simplified block diagram illustrating an autoregressive token processing method in a transformer decoder architecture.

An important transformer model class includes those based on just the decoder stack (e.g., transformer language models such as GPT-2, GPT-3, etc.), which pose particular challenges for inference. FIG. 6B illustrates an example autoregressive token processing method, which uses a decoder stack to process one token at a time from the segment 602 ("the quick brown fox jumps over the lazy dog"). This decoder stack includes a plurality of decoder layers 620, each with a self-attention layer 622 and a feed forward layer neural network 626. Here, the input token "fox" is being processed after the previous tokens "brown", "quick", "the", and the start token "<s>". In an example, query (Q), key (K), and value (V) vectors are created for each input token by multiplying each token with Q, K, and V weight matrices, respectively. The processing method for each token includes computing the dot product of the Q vector of the current token and the K vector of each token in the segment to determine the percentage scores for each token relative to the present token, as shown in the self-attention layer 622. In this case, the method includes a masked self-attention process which future tokens are scored as zero, thus the score values are only calculated for the present token and any preceding tokens. Then, the value vectors for each token are multiplied with its respective score value and all summed up, resulting in an output vector for the present token. The output vector for the given token is then passed to the next decoder layer 620 for further processing (shown by the shaded vectors following the dotted line arrow). As the Q, K, and V vectors are created for each token, the Q, K, and V matrices containing these vectors grow dynamically with each additional token (shown by the diagram on the right side of the self-attention layer 622).

Transformers are based on four parameters: sequence length (S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

The self-attention process includes (1) determining query (Q), key (K), and value (V) vectors for the embedding of each word in an input sentence, (2) calculating a score from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output. Note that the value matrix V becomes the weight matrix for matrix multiplication with softmax attention matrix; in the context of block floating point numerics, this requires a column blocking converter for V as described below. The column wise blocking of V is more complicated in decoder transformer architectures where the V matrix grows one row at a time for each additional token input. For column wise blocking, this would require re-quantizing the last matrix tile to block floating point for each additional row of V.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers has a plurality of matrix multipliers including QKV matrices configured for an attention layer of a transformer followed by three fully-connected matrices (FC). In this configuration, the DIMC is configured to accelerate the transformer and further includes a dot product of Q $K^T$ followed by a softmax (Q $K^T$/square root (dk))V. In an example, the AI accelerator apparatus also includes a SIMD device (as shown in FIGS. 3A and 3B) configured to accelerate a computing process of the softmax function.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

Figure 7:
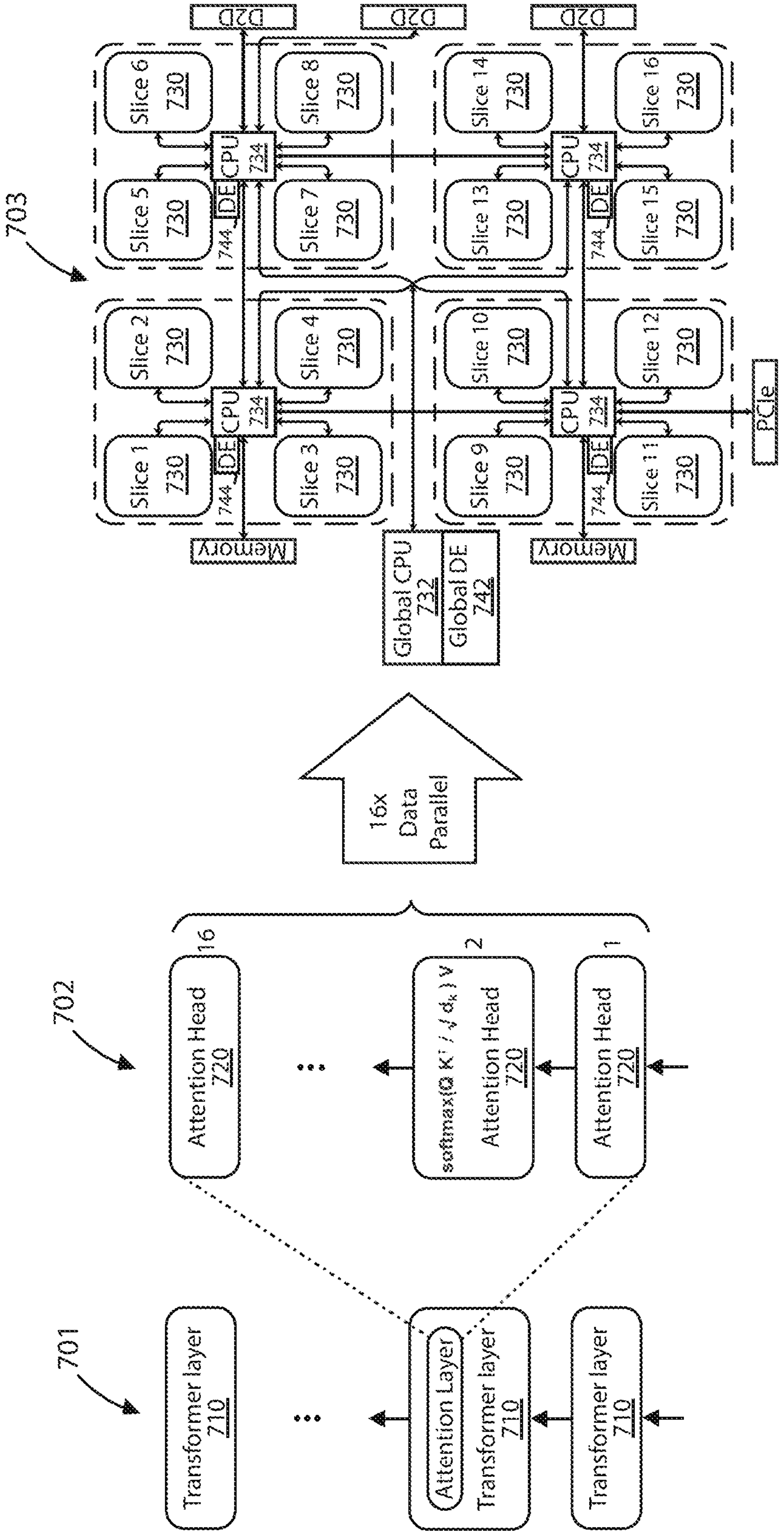
FIG. 7 is a simplified block flow diagram illustrating a mapping process between a transformer and an AI accelerator apparatus according to an example of the present invention.

FIG. 7 is a simplified block flow diagram illustrating a mapping process between a transformer and an example AI accelerator apparatus. As shown, a transformer 701 includes a plurality of transformer layers 710, each having an attention layer 702. In this case, there are 16 attention heads 720 (e.g., BERT Large) computing the attention function as discussed previously. These 16 attention heads are mapped to 16 slices 730 of an AI accelerator apparatus 703 (similar to apparatuses 201 and 202) via global CPU 732 communicating to the tile CPUs 734.

Figure 8:
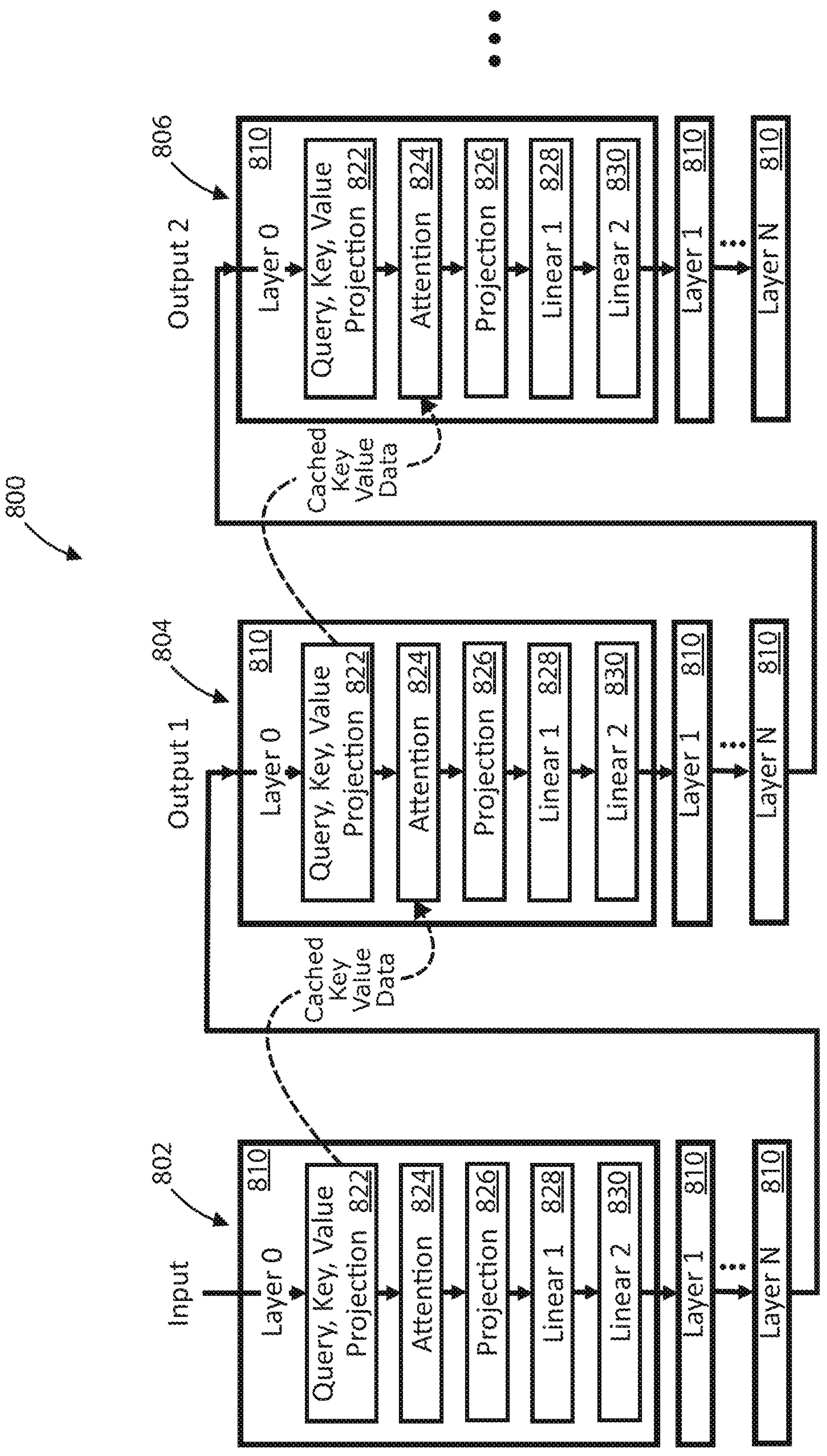
FIG. 8 is a simplified flow diagram illustrating a method of operating a generative transformer model according to an example of the present invention.

FIG. 8 is a simplified flow diagram 800 illustrating a method of operating a generative transformer model according to an example of the present invention. The generative transformer model is represented by a plurality of layers 810, denoted "Layer 0" to "Layer N", configured to cyclically process input tokens using an attention mechanism. Each layer of this model includes at least the following steps/layers: a Query, Key, Value (QKV) projection layer 822; an attention layer 824; a projection layer 826; a first linear layer 828; and a second linear layer 830. In an example, these layers can correspond to the self-attention steps discussed previously.

In the QKV projection layer 822, three vectors (query, key, and value vectors) are created for each input token (e.g., embedding vector). These vectors are determined by multiplying the input token by three weight matrices trained during the training process. In the attention layer 824, a score is determined between a target token and each token in the sequence. This score is calculated by the dot product of the target token's query vector and each token's key vector (in a transposed format).

In the subsequent projection layer 826, the scores by the square root on the dimension (dk) of the key vectors, and a softmax operation is performed to normalize the scaled scores. Then, in the linear layers 828 and 830, each value vector is multiplied by the softmax score to determine weighted value vectors, and the weighted value vectors are added to produce the output for the target token.

In an example, these operations are condensed using matrix operations. The input tokens can be configured in a matrix and multiplied with the three weight matrices to produce query, key, and value matrices. The scores are determined by the dot product of the query and transposed key matrices, and the softmax of those scores after scaling is multiplied with the value matrix to determine an output matrix.

The plurality of layers 810 (Layers 0 to N) process the input tokens to produce an output, and the resulting output can be processed through the plurality of layers 810 again. As shown, the layers 810 receive the input tokens at step 802, and the output from the first cycle (denoted "Output 1") is fed through the layers 810 again to produce an output for the second cycle (denoted "Output 2"). In step 804, the previous output is processed through the plurality of layers 810 yet again. Along with the previous output, new input tokens can be introduced to the plurality of layers 810. This process can repeat until the desired result for the given application is obtained.

During this process, the generative model continuously reads and updates the key and value data. In an example, the key and value data are stored in one or more designated memory caches. As shown in FIG. 8, the cached key and value data from the QKV projection layer 822 of step 802 is used in the attention layer 824 of step 804 (shown by the dotted line arrow). Similarly, the cached key and value data from the QKV projection layer 822 of step 804 is used in the attention layer 824 of step 806, and so on and so forth. In this manner, the model only has to process new input tokens, as the previously processed input tokens do not need to be processed again. Of course, those of ordinary skill in the art will recognize other variations, modifications, and alternatives.

Figure 9:
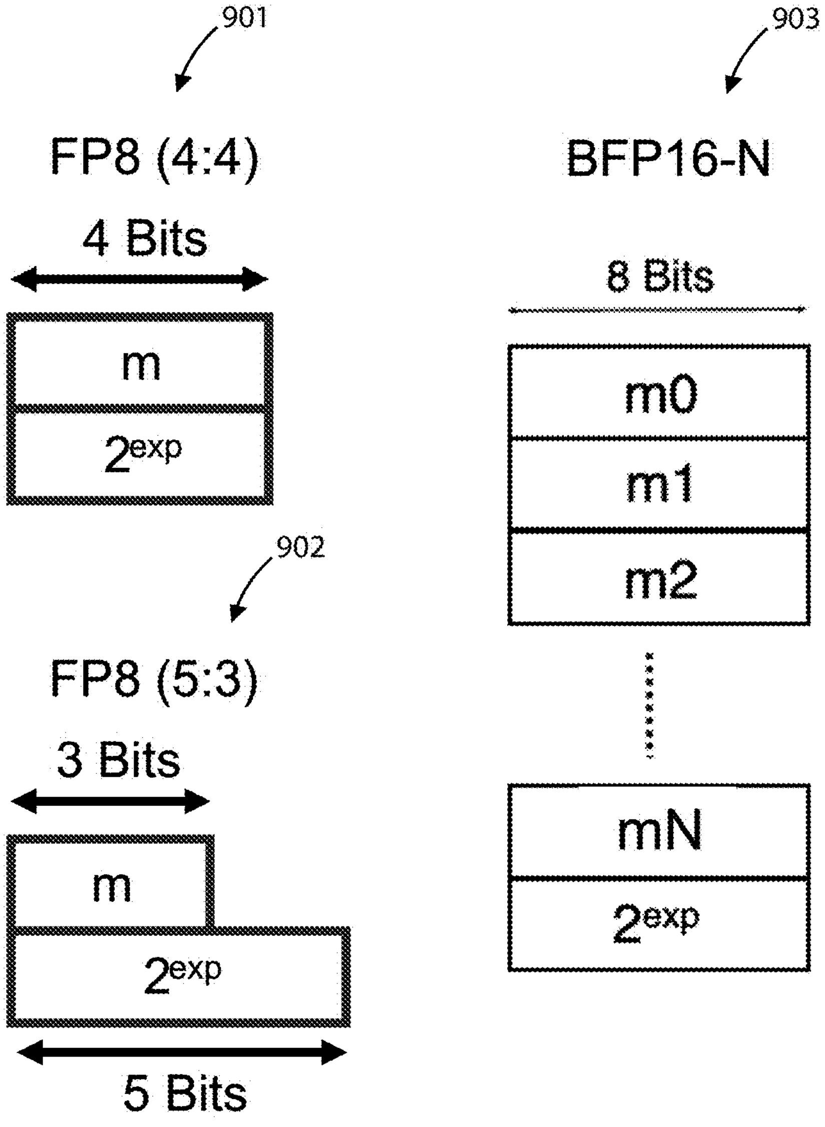
FIG. 9 is a simplified diagram illustrating numerical formats used in a transformer model according to an example of the present invention.

FIG. 9 is a simplified diagram illustrating numerical formats used in a transformer model according to an example of the present invention. As discussed previously, training of transformers is generally done in a floating point (FP) format. Here, the first 8-bit floating point (FP8) format 901 includes a 4-bit mantissa and a 4-bit exponent, while the second FP8 format 902 includes a 3-bit mantissa and a 5-bit exponent. Low precision formats, such as FP8, reduce the bits for both exponent and mantissa, which often results in high accuracy loss.

Blocked formats, such as block floating point (BFP), share the exponent for a number of elements. For example, the BFP16-N format 903 provides an 8-bit mantissa per element (e.g., 0 to N elements; N=16, 64, 125, etc.) and an 8-bit shared exponent per block. Such blocked formats allow for high precision and high range. In an example, use of the BFP16-N format 903 can include approximately 8-bit storage and 8-bit compute performance.

According to an example, the present invention relates to processing transformer workloads in a transformer compute apparatus. In certain applications, it is desirable to improve the handling of large data sizes. For example, transformer-based modeling networks typically involve an enormous number of elements (e.g., weights, activations, etc.) that cannot all be stored in on-chip memory. Thus, accessing these elements requires frequent transfers from a memory storage device (e.g., DDR), which can cause the processing of these elements to become memory bound due to the large latency of such memory operations. Additionally, quantizing the data into certain formats can pose challenges in cases in which the target matrix data is characterized by a changing contraction dimension due to redundant quantizations, potential accuracy reduction, and inefficient memory/cache transfers.

Figure 10A:
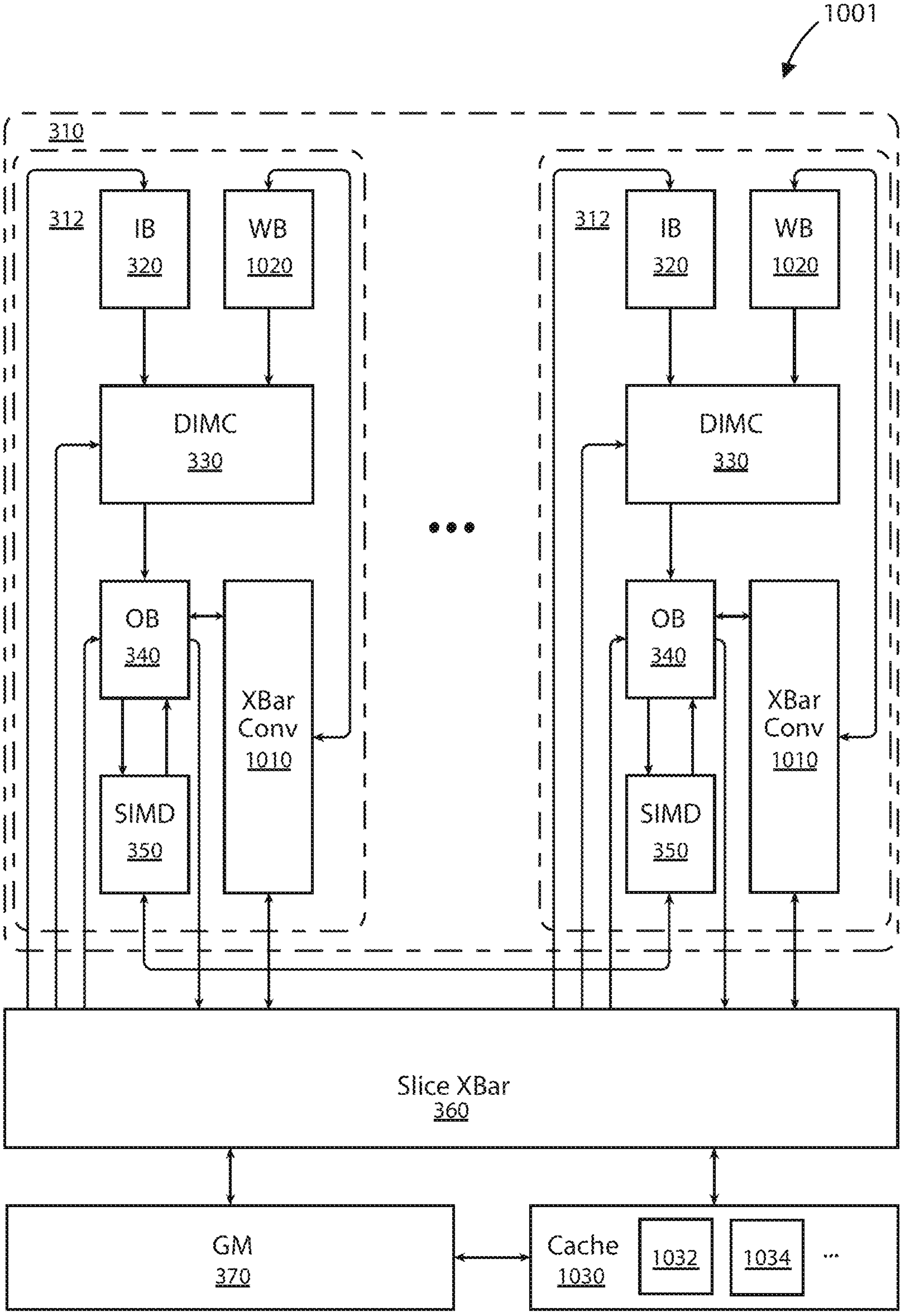
FIGS. 10A and 10B are simplified diagrams illustrating transformer compute apparatuses according to examples of the present invention.

FIG. 10A is a simplified diagram illustrating a transformer compute apparatus 1001 (or matrix multiply compute apparatus) according to an example of the present invention. As shown, this apparatus can be configured similarly to the example slice device 301 of FIG. 3A. Any shared reference numerals between these figures refer to the same elements as described previously. In contrast, apparatus 1001 includes a cache memory device 1030 coupled to the crossbar 360 and the memory device 370. The cache memory device 1030 can include at least a first cache device 1032 and a second cache device 1034. The cache memory device 1030 can include additional cache devices as well.

The apparatus 1001 also includes a crossbar converter device 1010 coupled to the crossbar 360, the input buffer (IB) device 320, and a weight buffer (WB) device 1020, which is coupled to the compute device 330. The converter device 1010 can receive data directly from the output buffer (OB) device or from the memory device 370 or the cache memory device 1030 via the crossbar device 360. And, the converter device 1010 can convert the data from a first format to a second format by determining a mantissa values and shared exponent values from the data in the first format. Then, these mantissas and shared exponents are stored in a blocking configuration in a designated memory location (e.g., memory device 370, cache memory device 1030, etc.). In a specific example, the first format can be a floating point (FP) format, while the second format can be a block floating point (BFP) format. Further, the crossbar device 360 can send the converted data to the IB device 320 and/or the WB device 1020 in preparation for processing by the compute device 330.

In an example, the WB device 1020 can be configured together with the IB device 320 as one buffer device. Also, the crossbar converter device 1010 can be configured together or separately within each compute path 312. Alternatively, the crossbar converter device 1010 can also be configured within the crossbar device 360 and be coupled to each compute path 312.

Figure 10B:
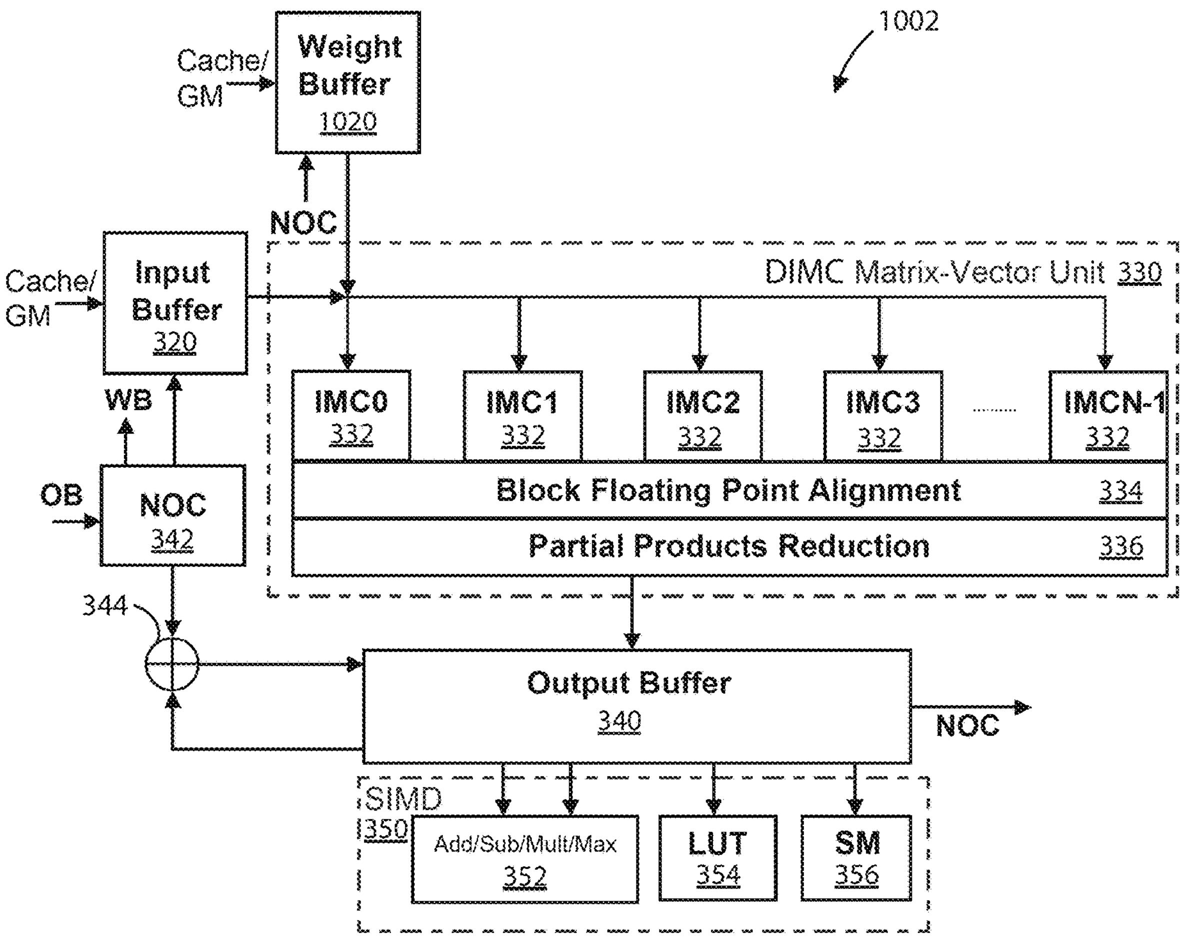

FIG. 10B is a simplified diagram illustrating a transformer compute apparatus 1002 (or matrix multiply compute apparatus) according to an example of the present invention. As shown, this apparatus 1002 can be configured similarly to the example slice device 302 of FIG. 3B. In contrast, apparatus 1002 includes the WB device 1020 coupled to the in-memory-compute (IMC) modules 332. Similar to the IB device 320, the WB device 1020 is also coupled to the network-on-chip (NOC) device 342 and to a memory device (denoted by input from "GM"). As discussed previously, the WB device 1020 can be configured together with the IB device 320.

This apparatus includes at least a data path having an IB device, a compute device coupled to the IB device, an OB device coupled to the compute device, and a SIMD device coupled to the OB device. One or more of these data paths, and each of the components therein, are coupled to a crossbar device, which is also coupled at least to a memory device. Further, a crossbar converter device can be configured within the crossbar device, or within each data path coupled the crossbar device and the OB device. In a specific example, the transformer compute apparatus can be configured in a low precision, high accuracy system for generative large language models (LLMs) with support for BFP numerics and storage. This apparatus can also be configured within a chiplet device and/or an AI accelerator device. Depending on the embodiment, this apparatus can include any of the elements and configurations discussed previously.

According to an example, the present invention provides for a method of operating a transformer compute apparatus to process a transformer workload using weight permutation. Generally, the method for processing a transformer workload includes processing input data in various operations within a plurality of layers, many of which include operations using static weight matrices with inputs to determine certain tokens for subsequent matrix or vector operations. These tokens are often quantized in a lower precision format, such as block floating point (BFP) formats, to reduce their memory footprint (e.g., in cache memory, global memory, etc.) and to improve performance of the subsequent operations. However, the distribution of values in both the weights and the inputs (e.g., activations) can include outliers (in terms of vector norms) that can affect the accuracy (e.g., due to rounding) of other values within the same quantized unit (e.g., blocks of BFP format) of the resulting token.

By using weight permutation, a target static weight matrix of a target operation having one or more outliers can be permuted along the quantization dimension of the result to mitigate the impact of such outliers on the quantized result. In an example, the target operation includes a first and a second weight matrix that are used with one or more input vectors in a sequential operation. These weight matrices can include those such as the query (Q) and key (K) weight matrices used to determine Q and K tokens in the Q-$K^T$ dot product of the self-attention operation or a first and a second function weight matrix that are used with input vectors along with an element-wise non-linearity function (e.g., Gaussian error linear unit [GeLU] function, rectified linear unit [ReLU] function, and the like) in a feedforward network (FFN) layer operation.

The method includes performing a permutation process on both a target weight matrix known to have one or more outlier values and a matching permutation process on an associated weight matrix of a target operation. In an example, this target weight matrix (e.g., the first or the second weight matrix) is permuted along a chosen dimension (e.g., row or column) according to its vector norms in ascending or descending order. In a specific example, the chosen dimension is along the quantization dimension of the operation result or an intermediate result.

To preserve the output of the operation, the other weight matrix in the operation is permuted to match the permutation of the target weight matrix (i.e., along an inner product dimension/contraction dimension), as the synchronized permutation of both weight matrices will result in the same product of those matrices or the same product of intermediate matrix multiplication results using those matrices. Also, in operations that also include rotary positional embeddings (RoPE) matrices, the matching permutation process can be applied to the RoPE matrix as well. Or, the RoPE matrix can be permuted in an element-wise product representation, which can be applied to the permuted weight matrices in the operation to preserve the output.

The synchronized permutation of both matrices (i.e., a permutation process on the target weight matrix and a matching permutation process on the associated weight matrix) reduces the variance between the dimension units (e.g., rows or columns) of the permutated target weight matrix, which also reduces the variance between elements of the resulting output. And by reducing the variance of the elements of the output, this method also reduces variance of the elements within each quantized unit (e.g., block) of the resulting output in the quantization format (e.g., BFP format). This variance reduction mitigates the impact of outlier values because the accuracy of each quantized unit can be maintained when the values within each such unit are relatively close together even if the distribution of all the values of the resulting output has a much greater range.

In the case that more than one static weight matrices of an operation are known to have one or more outliers, the weight permutation method can include determining which static weight matrix should be the primary target for the permutation process according to one or more priority factors. Such factors can include whether an intermediate result using the weight matrix will be quantized, which weight matrix has a lower quantization accuracy, which weight matrix has outliers of highest absolute value, which weight matrix has more outlier values, as well as others. Alternatively, the weight permutation method can include applying the permutation process to each such weight matrix known to have outliers along with the matching permutation process to one of the associated weight matrices immediately before or after the target matrix in the operation. Then, the method can include comparing the resulting permuted weight matrices of each case to determine which case results in the permuted weight matrix with the least variance of vector norms between the chosen dimension units (e.g., rows or columns).

The weight permutation method can also include applying multiple permutation processes to different static weight matrices in different sub-operations of an operation sequence. In the case that more than one sub-operation in the sequence has a static weight matrix known to have one or more outliers, the weight permutation method can include applying the permutation process to a target weight matrix of each sub-operation along with the matching permutation process to one of the associated weight matrices immediately before or after the target matrix in the sub-operation. In the case that any sub-operation includes multiple weight matrices having one or more outliers, the method can include choosing certain weight matrices according to one or more priority factors or comparing the cases of applying the permutation process to each such target weight matrix and determining which case results in the least variance of vector norms between the chosen dimension units (e.g., rows or columns).

In an example, the weight permutation process can be performed by an external computing device that is coupled to a target workload processing hardware (e.g., transformer compute apparatus, chiplet device, AI accelerator apparatus, and the like). The permuted static weight matrices can then be sent to the target hardware to be used in processing the transformer workload. Afterwards, the target hardware computes the operations using the permuted static weight matrices, which mitigate the impact of any outliers on the accuracy of the quantized result. Further details are discussed with respect to FIG. 11.

Figure 11:
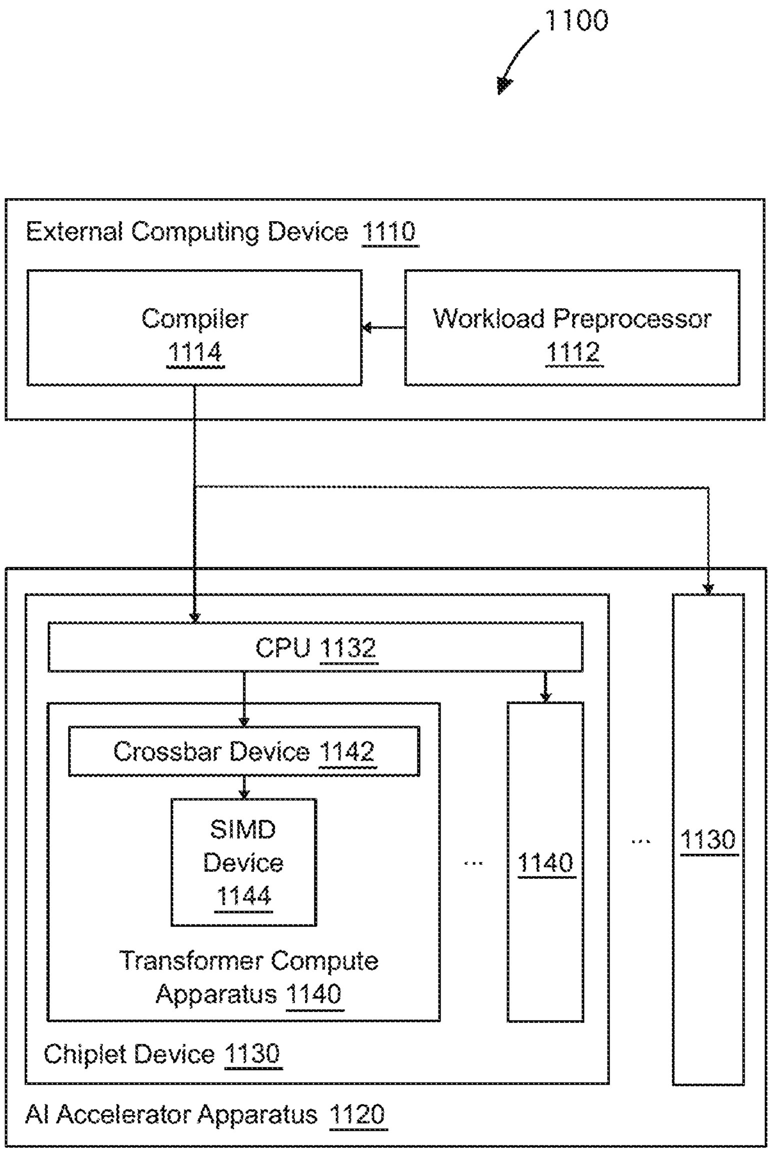
FIG. 11 is a simplified block diagram illustrating a method of transferring workload data to a transformer compute apparatus according to an example of the present invention.

FIG. 11 is a simplified block diagram illustrating a method of transferring workload data to a transformer compute apparatus according to an example of the present invention. As shown in an artificial intelligence (AI) accelerator system 1100, an external computing device 1110 includes a workload preprocessor 1112 configured with a compiler. In an example, the workload preprocessor 1112 can be configured to determine a target weight matrix having one or more outlier values and an associated weight matrix of a target operation of a target workload by passing over a computation graph representing the target workload. The workload preprocessor can also determine a permuted target weight matrix by permuting its dimension units (e.g., rows or columns) along the quantization dimension of the operation result or an intermediate result according to their vector norms in ascending or descending order. In an example, the vector norms can include Euclidean norms, L1 norms, and the like. Then the workload preprocessor can determine a permuted associated weight matrix by permuting its dimension units in the same manner as the permuted target weight matrix. Further, in cases using a rotary positional embeddings (RoPE) matrix, the workload preprocessor can determine a permuted RoPE matrix in an element-wise product implementation. In a specific example, determining and permuting the target weight matrix, the associated weight matrix, and the RoPE matrix (if any) can be performed offline.

In an example, the workload preprocessor 1112 can apply multiple permutation processes to different static weight matrices in different sub-operations of an operation sequence. As discussed previously, each sub-operation can be permuted separately and different cases of multiple static matrices with outliers can be evaluated to determine which of the weight matrices should be the target weight matrix for the primary permutation process. Then the permuted matrices and other workload data are passed on to the compiler 1114, which issues commands to configure a connected target hardware to apply the permuted matrices and other workload data in the appropriate computations.

In an example, the target hardware includes an AI accelerator apparatus 1120 with a plurality of chiplet devices 1130 coupled to a CPU 1132, which can include a global CPU and a plurality of local CPUs. The chiplet CPU 1132 is coupled to a plurality of transformer compute apparatuses 1140 via their crossbar devices 1142, each of which is coupled to a Single Input, Multiple Data (SIMD) device 1144 that applies the scaling factors to the appropriate operations. In an example, the compiler commands are sent to the CPU 1132 (or CPUs), which sends the commands through the crossbar device 1142 of the transformer compute apparatus to the SIMD device 1144. The AI accelerator apparatus 1120, the chiplet devices 1130, and the transformer compute apparatus 1140 can be configured similarly to any of the previously discussed examples.

Although the transformer compute apparatus 1140 is configured within a chiplet device 1130 in an AI accelerator device 1120 in this example, the external computing device 1110 can also be configured send the compiler commands to an independent chiplet device with transformer compute apparatuses or even an independent transformer compute apparatus having a CPU coupled to the crossbar device. Those of ordinary skill in the art will recognize other variations, modifications, and alternatives to this workload transfer configuration.

Figure 12A:
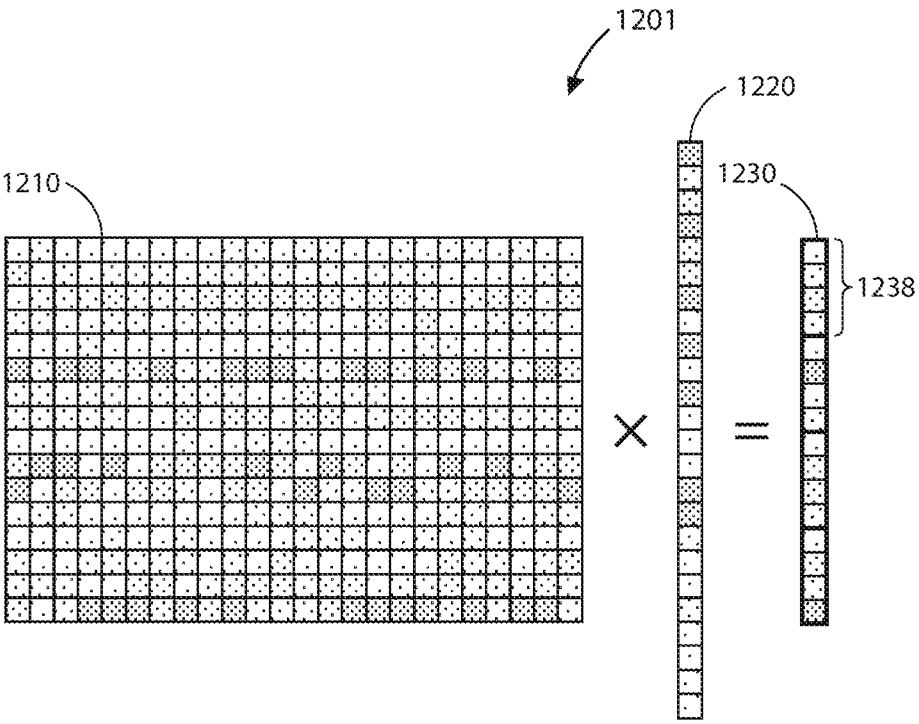
FIGS. 12A and 12B are simplified diagrams illustrating a method of permuting a static weight matrix according to an example of the present invention.
Figure 12B:
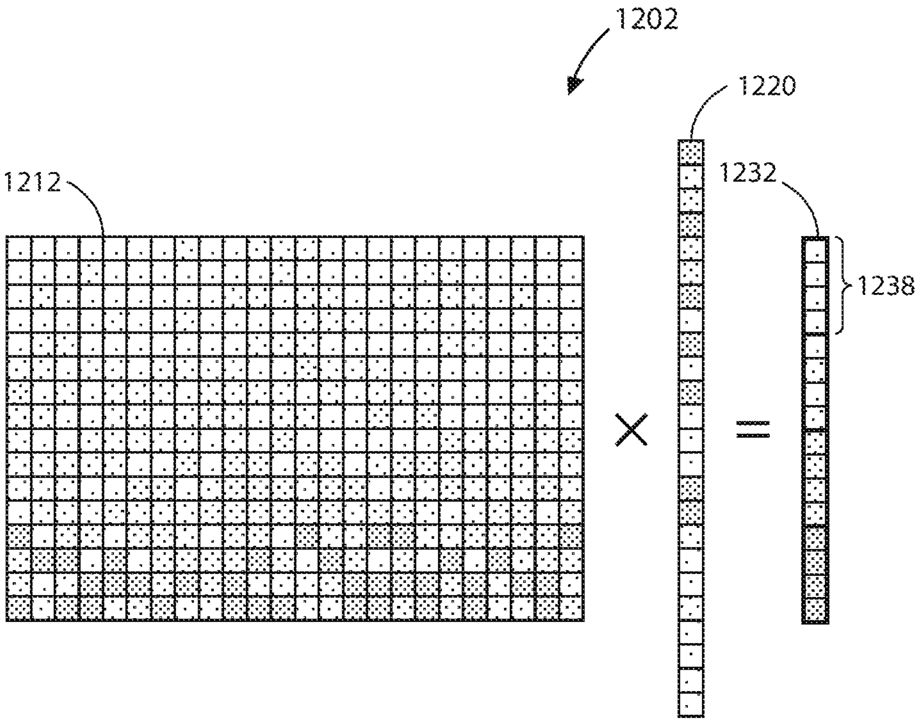

FIGS. 12A and 12B are simplified diagrams illustrating a method of permuting a static weight matrix according to an example of the present invention. As shown in FIG. 12A, the matrix operation 1201 includes a first weight matrix 1210 multiplied by an input vector 1220, and the result vector 1230 is shown after being quantized in a plurality of quantization units 1238. The elements of each of these matrix and vector are shown with varying dot concentrations, which represent the absolute values of the elements. Higher dot concentrations represent higher values, while lower dot concentrations represent lower values.

As discussed previously, both weight matrices and input vectors can include outliers, which may be unevenly distributed as shown by the sporadic positions of high dot concentration elements in the weight matrix 1210 and the input vector 1220. Due to these outliers, the values of the result vector 1230 from row-to-row can vary greatly, and thus the quantized units 1238 of the quantized result 1230 can vary greatly well. Here, of the four quantized units 1238 shown, both the second unit from the top and the bottom unit include elements of the lowest and the highest values. These wide ranges of values within the same quantized units 1238 can result in poor accuracy due to rounding of the values (e.g., lower values rounded to zero) according to the quantization format.

By using weight permutation, the rows of the weight matrix 1210 is reordered in ascending order according to the Euclidean norms of the rows, resulting in the permuted weight matrix 1212. As shown in FIG. 12B, the rows of matrix 1212 are reorganized such the rows with the elements having the highest dot concentrations are at the bottom and the rows with the elements having the lowest dot concentrations are at the top. When the permuted matrix 1212 is multiplied by the input vector 1220, the variance between the elements of the result vector 1232 from row to row is reduced, which leads to the variance between values within the quantization units 1238 of the quantized result 1232 being reduced as well. With narrower ranges of values within each quantization unit 1238, the accuracy of the quantized result is maintained.

Although this example shows a target weight matrix with its rows being permuted in ascending order of the row norms, the method can instead include permuting the columns of the weight matrix (e.g., in an operation with input row vectors) or include permuting the dimension units (rows or columns) of the weight matrix across the quantization dimension in a descending order. Those of ordinary skill in the art will recognize other variations, modifications, and alternatives to this permutation process.

In an example, the weight permutation method can be applied to self-attention operations to be performed by a transformer compute apparatus, chiplet device, AI accelerator apparatus, and the like. As discussed previously, the self-attention process includes matrix computations with query (Q), key (K), and value (V) tokens that are each determined from a static weight matrix and an input vector. And, the self-attention process for each input includes determining a score from the dot product of the Q and K tokens that is used in a softmax operation, and the V token is multiplied with the output of the softmax operation to produce a weighted V token that is accumulated as part of the self-attention output. Since this process requires the calculation of K and V tokens for the entire sequence generated up to the current iteration, the K and V tokens are typically quantized and stored in cache memory to avoid repeated duplicate computations.

FIG. 13A is a simplified diagram illustrating a method of weight permutation applied to a self-attention score operation using the Q and K tokens according to an example of the present invention. As shown, the score operation 1301 can be represented by an input (row) vector 1310 multiplied by the Q weight matrix ($W_Q$) 1320 (resulting in Q projection tokens), which is then multiplied by the transposed K weight matrix ($W_K$) 1330 that is multiplied by the transposed input vector 1312 (resulting in K projection tokens). Since the K tokens are typically quantized into a lower precision format (such as BFP12) for memory savings while the Q tokens are quantized into a higher precision format (such as BFP16) since they are not stored, the permutation process 1340 (denoted as π) is first applied to matrix $W_K^T$. Here, the rows of matrix $W_K^T$ 1330 are sorted in descending order of the row vector norms, which are shown by the decreasing density of the diagonal line shading from row to row.

To preserve the score operation output, a matching permutation process 1342 (denoted as π') is applied to matrix $W_Q$, which includes permuting the corresponding columns of matrix $W_Q$ 1320 (i.e., along the inner product dimension/contraction dimension) in the same manner as done to the rows of matrix $W_K^T$ 1330. This matching permutation 1342 is shown by dotted-line columns having the same diagonal line shading indicating that these are the columns from the original matrix $W_Q$ index positions matching the rows from the original matrix $W_K$ index positions that have been permuted to new index positions. By performing this complementary permutation process 1342, the output of the score operation using these permuted weight matrices 1320, 1330 will remain the same.

The weight permutation method can also be applied when operations use rotary embeddings to encode positional information. Many modern large language models (LLMs) use rotary positional embeddings (RoPE) to encode information about the order of tokens in an input sequence. The rotary embeddings are linear transformations that can be defined as $$R_{\Theta,m}^{d_h}=\begin{pmatrix}\cos m\Theta_1 & -\sin m\Theta_1 & \cdots & 0 \\ \sin m\Theta_1 & \cos m\Theta_1 & \cdots & 0 \\ \vdots & \ddots & \ddots & \vdots \\ 0 & \cdots & \cos m\Theta_{d_h/2} & -\sin m\Theta_{d_h/2} \\ 0 & \cdots & \sin m\Theta_{d_h/2} & \cos m\Theta_{d_h/2}\end{pmatrix},$$

where m is the token index, and $\Theta_i$, $i \in 1 \ldots d_h/2$ are predefined constants with the head dimension $d_h$. Matrices $$R_{\theta,m}^{d_h}$$

define block-diagonal orthogonal transformations rotating 2-dimensional linear subspaces spanned by every consecutive pair of standard basis vectors. Due to the evident sparsity of $$R_{\theta,m}^{d_h},$$

the multiplication can be implemented as the following linear transformation of the input vector x, $$R_{\Theta,m}^{d_h}x=\begin{pmatrix}x_1\\x_2\\x_3\\x_4\\\vdots\\x_{d_h-1}\\x_{d_h}\end{pmatrix}\otimes\begin{pmatrix}\cos m\Theta_1\\\cos m\Theta_1\\\cos m\Theta_1\\\cos m\Theta_1\\\vdots\\\cos m\Theta_{d_h/2}\\\cos m\Theta_{d_h}/2\end{pmatrix}+\begin{pmatrix}-x_2\\x_1\\-x_4\\x_3\\\vdots\\-x_{d_h}\\x_{d_h-1}\end{pmatrix}\otimes\begin{pmatrix}\sin m\Theta_1\\\sin m\Theta_1\\\sin m\Theta_2\\\sin m\Theta_2\\\vdots\\\sin m\Theta_{d_h/2}\\\sin m\Theta_{d_h/2}\end{pmatrix},$$

where ⊗ is the element-wise product.

FIG. 13B is a simplified diagram illustrating a method of weight permutation applied to the self-attention score operation of FIG. 13A with RoPE according to an example of the present invention. As shown, the score operation 1302 includes a RoPE matrix 1350 multiplied by Q tokens (input vector 1310 multiplied by matrix $W_Q$ 1320), which is then multiplied by the K tokens (matrix $W_K^T$ 1330 multiplied by input vector 1312). Similar to operation 1301 of FIG. 13A, the weight permutation method includes the same primary permutation process 7L on matrix $W_K^T$ 1330 and the same matching permutation process 7' on matrix $W_Q$ 1320. In an example, the matching permutation process 7' is also be applied to the RoPE matrix 1350 to preserve the operation output. Alternatively, the RoPE matrix 1350 can be permuted in the element-wise product representation using multiple permutation processes on different vectors of the representation (collectively denoted as π") to preserve the output of the operation 1302.

In the element-wise product RoPE representation scenario, the method includes performing a matching permutation process on the vector of frequencies Θ, the sine-sign channel indices i, and the corresponding signs of the sine-sign channels s. As discussed previously, the RoPE matrix 1350 can be implemented using element-wise multiplication between the input vector and separate vectors for the cosine and sine terms. Based on this RoPE implementation, the vector of frequencies is $\Theta=[\Theta_1, \theta_1, \theta_2, \theta_2, \ldots, \theta_{d_h/2}, \theta_{d_h/2}]$, the sine-sign channel indices are given by vector i=[2, 1, 4, 3, . . . , $d_h$, $d_h-1$], and the corresponding signs are given by vector s=[−1, 1, −1,1, . . . , −1,1]. By applying the matching permutations to the indices of these vectors, the resulting permuted implementation of the RoPE matrix 1350 using element-wise multiplication can be multiplied by the permuted weight matrices $W_Q$ and $W_K^T$, and the output of the operation 1302 will remain the same.

Depending on the model workload, the implementation of the RoPE matrices and the resulting order of these vectors Θ, i, and s can differ. Regardless, by using matching permutation processes on these vectors, the outputs of these operations using RoPE matrices will be preserved. Those of ordinary skill in the art will recognize other variations, modifications, and alternatives to the RoPE permutation processes.

Figure 14:
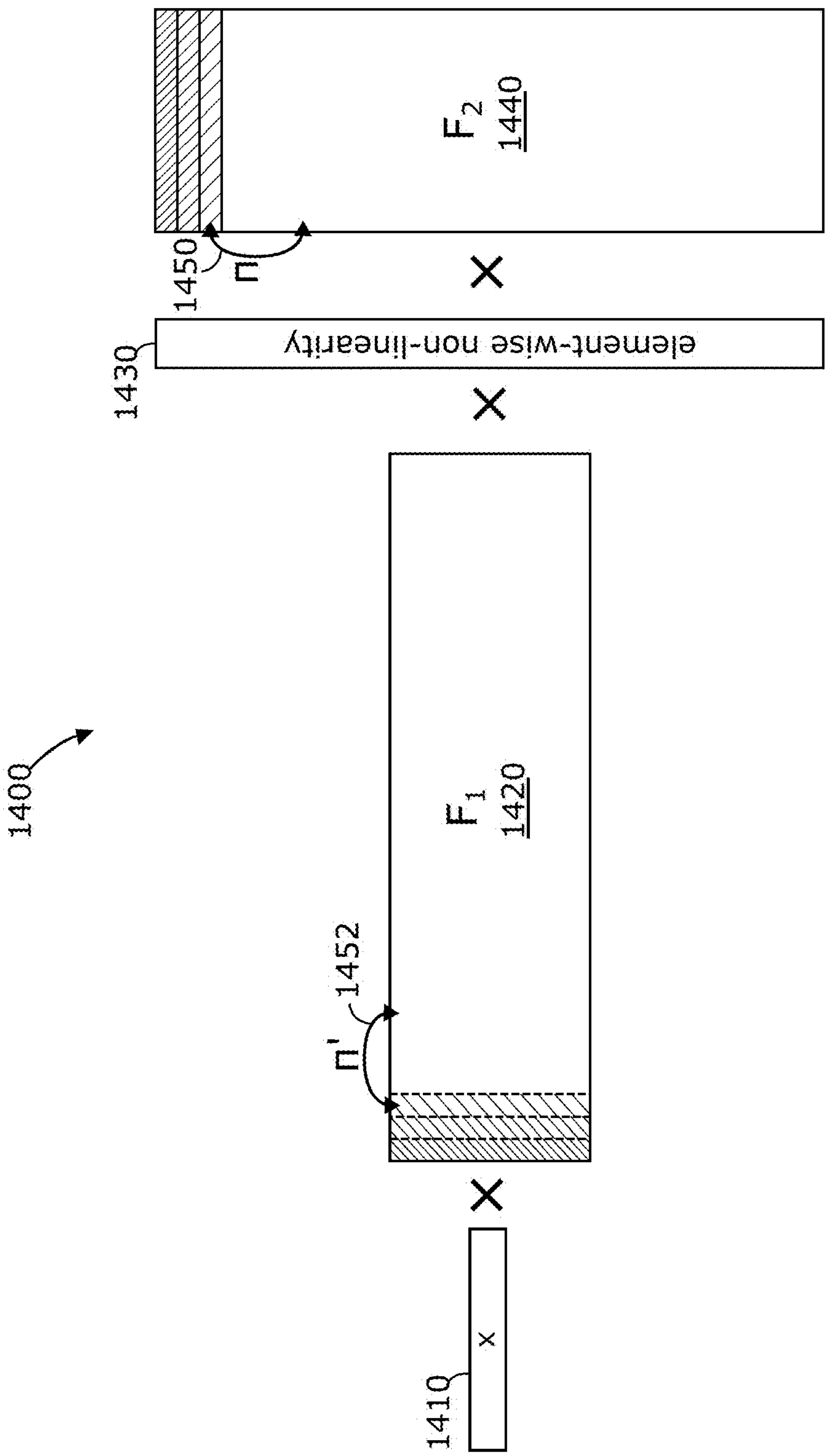
FIG. 14 is a simplified diagram illustrating a method of weight permutation applied to a FFN operation according to an example of the present invention.

In an example, the weight permutation method can be applied to feedforward network (FFN) operations to be performed by a transformer compute apparatus, chiplet device, AI accelerator apparatus, and the like. As discussed previously, both the encoder and decoder operations can include FFN operations following self-attention operations. FIG. 14 is a simplified diagram illustrating a method of weight permutation applied to a FFN operation according to an example of the present invention. As shown, the FFN operation 1400 can be represented by an input (row) vector 1410 multiplied by a first function weight matrix ($F_1$) 1420, which is then multiplied by an element-wise non-linearity function 1430 (e.g., GeLU, ReLU, etc.) that is multiplied by a second function weight matrix ($F_2$) 1440. Here, the non-linearity function 1430 is between a first linear layer sub-operation (multiplication with the $F_1$ 1420) and a second linear sub-operation (multiplication with $F_2$ 1440).

In this case, the permutation process 1450 (denoted as π) is first applied to matrix $F_2$ 1440, which includes sorting the rows of $F_2$ in descending order of the row vector norms, which are shown by the decreasing density of the diagonal line shading from row to row. Accordingly, a matching permutation process 1452 (denoted as π') is applied to the columns of matrix $F_1$ 1420 (i.e., along the inner product dimension) to preserve the FFN operation output. The matching permutation 1452 includes permuting the corresponding columns of matrix $F_1$ 1420 in the same manner as done to the rows of matrix $F_2$ 1440. Similar to the previous self-attention example, this matching permutation 1452 is shown by the dotted-line columns with the same diagonal line shading representing the permutation of the same index positions. Even with the element-wise non-linearity function 1430 between the two linear layer sub-operations (each including one of the weight matrices 1420, 1440), the output of the FFN operation 1400 will remain the same.

Although the self-attention and FFN examples show the second weight matrix of the operation with its rows being permuted in descending order of the row norms, the method can instead include permuting the columns of the first weight matrix in the sequence or include permuting the dimension units (rows or columns) of the weight matrix across the quantization dimension in ascending order. Those of ordinary skill in the art will recognize other variations, modifications, and alternatives to the application of the weight permutation method.

Figure 15:
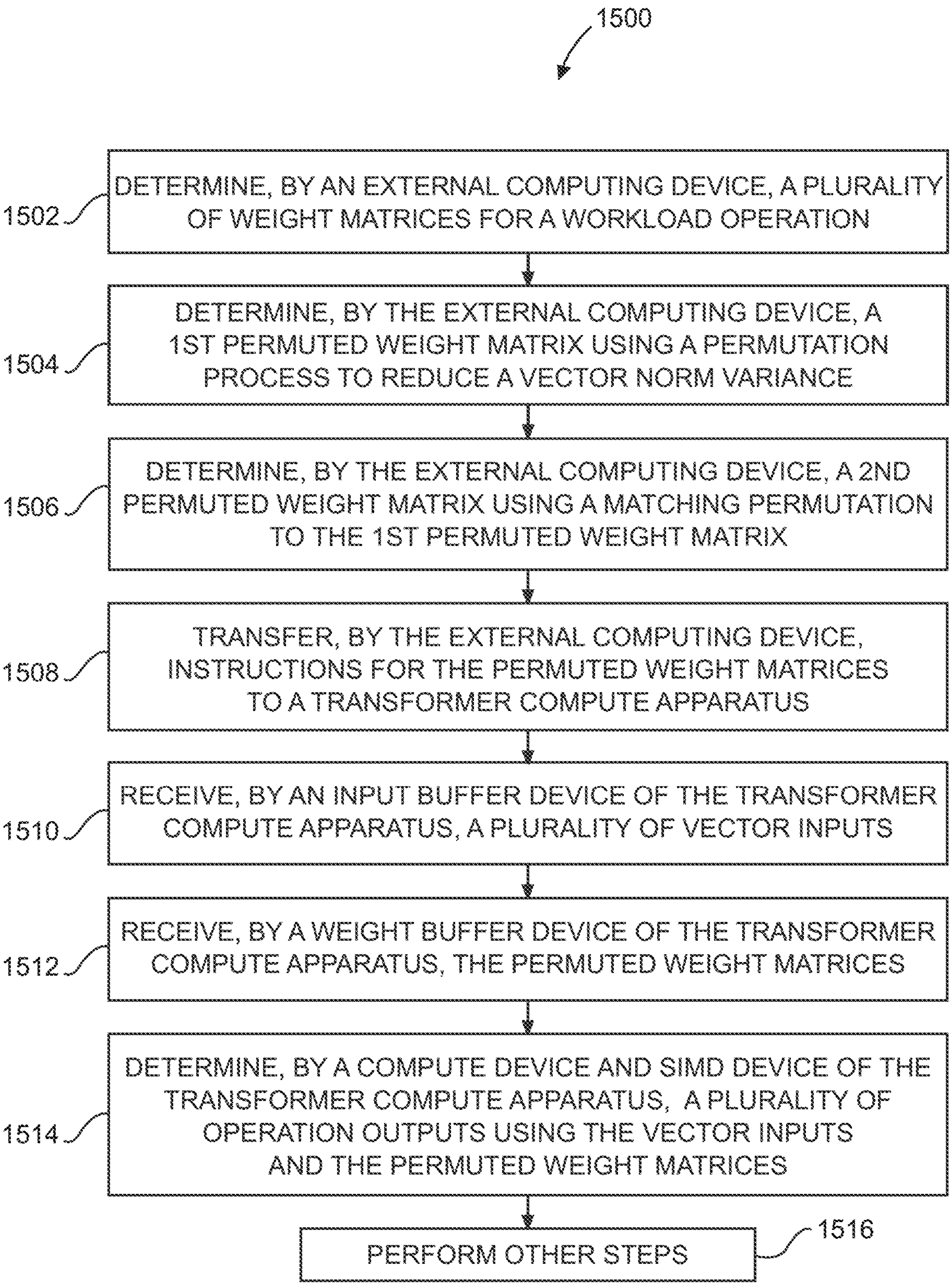
FIG. 15 illustrates a simplified flow diagram of a method of operating a transformer compute apparatus using weight permutation according to an example of the present invention.

FIG. 15 illustrates a simplified flow diagram of a method of operating a transformer compute apparatus using weight permutation according to an example of the present invention. This method 1500 can be briefly summarized as follows:

1502. Determine, by an external computing device, a plurality of weight matrices for a transformer workload operation, including at least a first weight matrix and a second weight matrix;

1504. Determine, by the external computing device, a first permuted weight matrix using a permutation process to reduce a variance of vector norm values between dimension units of the first weight matrix;

1506. Determine, by the external computing device, a second permuted weight matrix using a matching permutation process to match the permutation process of the first permuted weight matrix;

1508. Transfer, by the external computing device, the first and the second permuted weight matrices to a transformer compute apparatus;

1510. Receive, by an input buffer (IB) device of the transformer compute apparatus, a plurality of vector inputs;

1512. Receive, by a weight buffer (WB) device of the transformer compute apparatus, at least the first and the second permuted weight matrices;

1514. Determine, by a compute device of the transformer compute apparatus, a plurality of transformer workload operation outputs using the plurality of vector inputs, and the first and the second permuted weight matrices.

1516. Perform other steps as desired.

The above sequence of steps is used to operate a transformer compute apparatus using weight permutation according to one or more embodiments of the present invention. Depending on the embodiment, one or more of these steps can be combined, or removed, or other steps may be added without departing from the scope of the claims herein. One of ordinary skill in the art will recognize other variations, modifications, and alternatives. Further details of this method are provided below.

In step 1502, the method includes determining a plurality of weight matrices for a transformer workload using a workload preprocessor of an external computing device. In a specific example, the weight matrices can be determined using a computational graph representing a transformer workload. The plurality of weight matrices include at least a first weight matrix and a second weight matrix, each of which is configured in a plurality of dimension units (e.g., rows or columns) and both of which are used together in a matrix multiplication operation of the workload operation.

In step 1504, the method includes determining a first permuted weight matrix using a permutation process performed by the workload preprocessor on the dimension units of the first weight matrix. This permutation process includes reordering the dimension units of the first weight matrix to reduce a variance of the vector norm values between adjacent dimension units. In an example, the vector norms can include Euclidean norms, L1 norms, and the like.

In step 1506, the method includes determining a second permuted weight matrix using a matching permutation process performed by the workload preprocessor on the dimension units of the second weight matrix. This matching permutation process includes reordering the dimension units of the second weight matrix to match the reordering of the dimension units of the first weight matrix. In an example, the permutation process and the matching permutation process are synchronized such that these processes are performed along an inner product dimension/contraction dimension of the operation.

In an example, the matrices of the transformer workload operation includes a rotary positional embedding (RoPE) matrix. The workload preprocessor can determine this RoPE matrix from the computational graph, and can also determine an element-wise product representation of the RoPE matrix having a plurality of vector frequencies, a plurality of channel indices, and a plurality of signs. To preserve the operation output, the workload processor can determine a permuted element-wise product representation using the matching permutation process on the vector frequencies, the channel indices, and the signs. Further, the compiler can receive the permuted representation of the RoPE matrix, determine one or more compiler commands for the permuted RoPE representation, and send the commands to the transformer compute apparatus.

In step 1508, the method includes transferring the first and the second permuted weight matrices to the transformer compute apparatus. This step can include receiving the first and second permuted weight matrices by the compiler of the external computing device, which determines one or more compiler commands according to the permuted weight matrices and transfers these commands for the weight matrices to the transformer compute apparatus.

In step 1510, the method includes receiving a plurality of vector inputs by the IB device of the transformer compute apparatus. And in step 1512, the method includes receiving at least the first and the second permuted weight matrices by the WB device of the transformer compute apparatus. In an example, the SIMD device can receive the permuted RoPE representation to be used in the computations of the next step.

In step 1514, the method includes determining a plurality of transformer workload operation outputs using the plurality of vector inputs and the first and the second permuted weight matrices (and a RoPE matrix in some cases). Depending on the operation, this step can be performed by the compute device of the transformer compute apparatus or both the compute device and the SIMD device of the transformer compute apparatus. As discussed previously, the transformer workload operation can include self-attention operations, such as the score operation performed by the compute device using the Q tokens and quantized K tokens.

Or, the transformer workload operation can include an FFN operation using a first and a second function matrices along with an element-wise non-linearity function. In an example, the compute device performs the matrix multiplication using the first and the second function matrices, and the SIMD device can perform element-wise non-linearity function. Those of ordinary skill in the art will recognize variations, modifications, and alternatives to the steps of the weight permutation method depending on the workload operation.

As discussed previously, the method includes steps for processing a transformer workload. The transformer compute apparatus can be configured to perform computations using the permuted weight matrices to mitigate the effect of outliers on the quantized results of operations using those weight matrices or intermediate results. Following these steps, other steps can be performed as desired, as represented by step 1418. In a self-attention example, the results can be sent along to an FFN layer for further processing, and in an FFN layer example, the results can be sent along to another encoder/decoder layer.

While the above is a full description of the specific embodiments, various modifications, alternative constructions and equivalents may be used. As an example, the AI accelerator apparatus and chiplet devices and transformer compute devices can include any combination of elements described above, as well as outside of the present specification. Therefore, the above description and illustrations should not be taken as limiting the scope of the present invention which is defined by the appended claims.

What is claimed is:

1. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix;

converting, by the crossbar converter device, the first plurality of tokens from the first format to a second format, wherein the plurality of weight matrices includes a rotary positional embedding (RoPE) matrix;

determining, by a workload preprocessor of the external computing device, an element-wise product representation of the RoPE matrix having a plurality of vector frequencies, a plurality of channel indices, and a plurality of signs; and determining, by the workload preprocessor, a permuted element-wise product representation of the RoPE matrix using the matching permutation process on the plurality of vector frequencies, the plurality of channel indices, and the plurality of signs.

2. The method of claim 1 wherein determining the plurality of weight matrices for the transformer workload operation includes determining the plurality of weight matrices from a computational graph representing a transformer workload.

3. The method of claim 1 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

4. The method of claim 1 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

5. The method of claim 1 wherein the first format includes a floating point (FP) format and the second format includes a block floating point (BFP) format.

6. The method of claim 1 wherein using the permutation process on the first plurality of dimension units includes reordering the first plurality of dimension units in an ascending order based on vector norm values of the first plurality of dimension units.

7. The method of claim 1 further comprising determining, by a compiler of the external computing device, one or more compiler commands according to the permuted element-wise product representation of the RoPE matrix; and transferring, by the compiler, the one or more compiler commands for the permuted element-wise product representation of the RoPE matrix to the transformer compute apparatus.

8. The method of claim 7 wherein a Single Instruction, Multiple Data (SIMD) device is coupled to the OB device;

wherein determining, by the compute device, the plurality of transformer workload operation outputs comprises applying, by the SIMD device, a plurality of rotary embeddings to the first plurality of tokens using the permuted element-wise product representation of the RoPE matrix; and determining, the plurality of transformer workload operation outputs using the first plurality of tokens and the second plurality of tokens in the matrix multiplication operation.

9. The method of claim 1 wherein a cache memory device is coupled to the crossbar device; and further comprising storing, by the cache memory device, the plurality of converted first tokens in the second format.

10. The method of claim 1 further comprising determining, by the compute device, a plurality of transformer workload operation outputs using the first plurality of tokens and the second plurality of tokens in the matrix multiplication operation.

11. The method of claim 1 wherein the transformer workload operation includes a self-attention operation, and wherein the matrix multiplication operation includes a score sub-operation of the self-attention operation.

12. A method of operating a transformer compute apparatus, the method comprising:

determining, by an external computing device, a plurality of weight matrices for a transformer workload operation, wherein the transformer workload operation includes a feedforward network (FFN) operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices.

13. The method of claim 12 wherein determining the plurality of weight matrices for the transformer workload operation includes determining the plurality of weight matrices from a computational graph representing a transformer workload.

14. The method of claim 12 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

15. The method of claim 12 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

16. The method of claim 12 wherein using the permutation process on the first plurality of dimension units includes reordering the first plurality of dimension units in an ascending order or a descending order based on vector norm values of the first plurality of dimension units.

17. The method of claim 12 wherein determining the plurality of transformer workload operation outputs includes determining, by the compute device, a plurality of first function outputs using the plurality of vector inputs and the first permuted weight matrix;

determining, by the SIMD device, a plurality of SIMD outputs using the plurality of first function outputs in an element-wise non-linearity function; and determining, by the compute device, the plurality of transformer workload operation outputs using the plurality of SIMD outputs and the second permuted weight matrix.

18. The method of claim 12 wherein determining the plurality of transformer workload operation outputs includes determining, by the compute device, a plurality of intermediate outputs using the plurality of vector inputs and the second permuted weight matrix;

determining, by the SIMD device, a plurality of SIMD outputs using the plurality of intermediate outputs in an element-wise non-linearity function; and determining, by the compute device, the plurality of transformer workload operation outputs using the plurality of SIMD outputs and the first permuted weight matrix.

19. A method of operating a transformer compute apparatus, the method comprising:

determining, by an external computing device, a plurality of weight matrices for a transformer workload operation, wherein the transformer workload operation includes a self-attention operation, wherein the plurality of weight matrices includes at least a first weight matrix and a second weight matrix, wherein the first weight matrix includes a first plurality of dimension units having one or more outlier values, wherein the second weight matrix includes a second plurality of dimension units and is used in a matrix multiplication operation with the first weight matrix, and wherein the matrix multiplication operation includes a score sub-operation of the self-attention operation;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format.

20. The method of claim 19 wherein determining the plurality of weight matrices for the transformer workload operation includes determining the plurality of weight matrices from a computational graph representing a transformer workload.

21. The method of claim 19 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

22. The method of claim 19 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

23. The method of claim 19 wherein the first format includes a floating point (FP) format and the second format includes a block floating point (BFP) format.

24. The method of claim 19 wherein using the permutation process on the first plurality of dimension units includes reordering the first plurality of dimension units in an ascending order based on vector norm values of the first plurality of dimension units.

25. The method of claim 19 wherein a cache memory device is coupled to the crossbar device; and further comprising storing, by the cache memory device, the plurality of converted first tokens in the second format.

26. The method of claim 19 further comprising determining, by the compute device, a plurality of transformer workload operation outputs using the first plurality of tokens and the second plurality of tokens in the matrix multiplication operation.

27. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix;

converting, by the crossbar converter device, the first plurality of tokens from the first format to a second format;

wherein a cache memory device is coupled to the crossbar device; and storing, by the cache memory device, the plurality of converted first tokens in the second format.

28. The method of claim 27 wherein determining the plurality of weight matrices for the transformer workload operation includes determining the plurality of weight matrices from a computational graph representing a transformer workload.

29. The method of claim 27 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

30. The method of claim 27 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

31. The method of claim 27 wherein the first format includes a floating point (FP) format and the second format includes a block floating point (BFP) format.

32. The method of claim 27 wherein using the permutation process on the first plurality of dimension units includes reordering the first plurality of dimension units in an ascending order based on vector norm values of the first plurality of dimension units.

33. The method of claim 27 further comprising determining, by the compute device, a plurality of transformer workload operation outputs using the first plurality of tokens and the second plurality of tokens in the matrix multiplication operation.

34. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units in an ascending order based on vector norm values of the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format.

35. The method of claim 34 wherein determining the plurality of weight matrices for the transformer workload operation includes determining the plurality of weight matrices from a computational graph representing a transformer workload.

36. The method of claim 34 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

37. The method of claim 34 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

38. The method of claim 34 wherein the first format includes a floating point (FP) format and the second format includes a block floating point (BFP) format.

39. The method of claim 34 further comprising determining, by the compute device, a plurality of transformer workload operation outputs using the first plurality of tokens and the second plurality of tokens in the matrix multiplication operation.

40. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format;

wherein the first format includes a floating point (FP) format and the second format includes a block floating point (BFP) format.

41. The method of claim 40 wherein determining the plurality of weight matrices for the transformer workload operation includes determining the plurality of weight matrices from a computational graph representing a transformer workload.

42. The method of claim 40 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

43. The method of claim 40 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

44. The method of claim 40 further comprising determining, by the compute device, a plurality of transformer workload operation outputs using the first plurality of tokens and the second plurality of tokens in the matrix multiplication operation.

45. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

wherein the external computing device includes a compiler, and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format.

46. The method of claim 45 wherein determining the plurality of weight matrices for the transformer workload operation includes determining the plurality of weight matrices from a computational graph representing a transformer workload.

47. The method of claim 45 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

48. The method of claim 45 further comprising determining, by the compute device, a plurality of transformer workload operation outputs using the first plurality of tokens and the second plurality of tokens in the matrix multiplication operation.

49. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

wherein the external computing device includes a workload preprocessor;

wherein determining the plurality of weight matrices for the transformer workload operation includes determining, by the workload preprocessor, the plurality of weight matrices from a computational graph representing a transformer workload;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

wherein determining the first permuted weight matrix includes determining, by the workload preprocessor, the first permuted weight matrix using the permutation process on the first plurality of dimension units;

determining, by the external computing device, a second permuted weight matrix using a matching permutation process on the second plurality of dimension units to match the reordering of the first plurality of dimension units;

wherein determining the second permuted weight matrix includes determining, by the workload preprocessor, the second permuted weight matrix using the matching permutation process on the second plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format.

50. The method of claim 49 wherein determining the plurality of weight matrices for the transformer workload operation includes determining the plurality of weight matrices from a computational graph representing a transformer workload.

51. The method of claim 49 further comprising determining, by the compute device, a plurality of transformer workload operation outputs using the first plurality of tokens and the second plurality of tokens in the matrix multiplication operation.

52. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units having one or more outlier values, and wherein the second weight matrix includes a second plurality of dimension units and is used in a matrix multiplication operation with the first weight matrix;

wherein determining the plurality of weight matrices for the transformer workload operation includes determining the plurality of weight matrices from a computational graph representing a transformer workload;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a crossbar converter device coupled to the OB device and the crossbar device;

receiving, by the WB device, at least the first and the second permuted weight matrices;

determining, by the compute device, a first plurality of tokens in a first format using the plurality of vector inputs and the first permuted weight matrix and a second plurality of tokens in the first format using the plurality of vector inputs and the second permuted weight matrix; and converting, by the crossbar converter device, the first plurality of tokens from the first format to a second format.

53. The method of claim 52 further comprising determining, by the compute device, a plurality of transformer workload operation outputs using the first plurality of tokens and the second plurality of tokens in the matrix multiplication operation.

54. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices;

wherein determining the plurality of transformer workload operation outputs includes determining, by the compute device, a plurality of intermediate outputs using the plurality of vector inputs and the second permuted weight matrix;

determining, by the SIMD device, a plurality of SIMD outputs using the plurality of intermediate outputs in an element-wise non-linearity function; and determining, by the compute device, the plurality of transformer workload operation outputs using the plurality of SIMD outputs and the first permuted weight matrix.

55. The method of claim 54 wherein determining the plurality of weight matrices for the transformer workload operation includes determining the plurality of weight matrices from a computational graph representing a transformer workload.

56. The method of claim 54 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

57. The method of claim 54 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

58. The method of claim 54 wherein using the permutation process on the first plurality of dimension units includes reordering the first plurality of dimension units in an ascending order or a descending order based on vector norm values of the first plurality of dimension units.

59. The method of claim 54 wherein determining the plurality of transformer workload operation outputs includes determining, by the compute device, a plurality of first function outputs using the plurality of vector inputs and the first permuted weight matrix;

determining, by the SIMD device, a plurality of SIMD outputs using the plurality of first function outputs in an element-wise non-linearity function; and determining, by the compute device, the plurality of transformer workload operation outputs using the plurality of SIMD outputs and the second permuted weight matrix.

60. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices;

wherein determining the plurality of transformer workload operation outputs includes determining, by the compute device, a plurality of first function outputs using the plurality of vector inputs and the first permuted weight matrix;

determining, by the SIMD device, a plurality of SIMD outputs using the plurality of first function outputs in an element-wise non-linearity function; and determining, by the compute device, the plurality of transformer workload operation outputs using the plurality of SIMD outputs and the second permuted weight matrix.

61. The method of claim 60 wherein determining the plurality of weight matrices for the transformer workload operation includes determining the plurality of weight matrices from a computational graph representing a transformer workload.

62. The method of claim 60 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

63. The method of claim 60 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

64. The method of claim 60 wherein using the permutation process on the first plurality of dimension units includes reordering the first plurality of dimension units in an ascending order or a descending order based on vector norm values of the first plurality of dimension units.

65. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units in an ascending order or a descending order based on vector norm values of the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices.

66. The method of claim 65 wherein determining the plurality of weight matrices for the transformer workload operation includes determining the plurality of weight matrices from a computational graph representing a transformer workload.

67. The method of claim 65 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

68. The method of claim 65 wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus.

69. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

wherein the external computing device includes a compiler; and wherein transferring the first and the second permuted weight matrices to the transformer compute apparatus includes receiving, by the compiler, the first and the second permuted weight matrices;

determining, by the compiler, one or more compiler commands according to the first and the second permuted weight matrices; and transferring, by the compiler, the one or more compiler commands for the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices.

70. The method of claim 69 wherein determining the plurality of weight matrices for the transformer workload operation includes determining the plurality of weight matrices from a computational graph representing a transformer workload.

71. The method of claim 69 wherein the external computing device includes a workload preprocessor;

wherein determining the plurality of weight matrices for the transformer workload operation includes determining, by the workload preprocessor, the plurality of weight matrices from a computational graph representing a transformer workload;

wherein determining the first permuted weight matrix includes determining, by the workload preprocessor, the first permuted weight matrix using the permutation process on the first plurality of dimension units; and wherein determining the second permuted weight matrix includes determining, by the workload preprocessor, the second permuted weight matrix using the matching permutation process on the second plurality of dimension units.

72. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

wherein the external computing device includes a workload preprocessor;

wherein determining the plurality of weight matrices for the transformer workload operation includes determining, by the workload preprocessor, the plurality of weight matrices from a computational graph representing a transformer workload;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

wherein determining the first permuted weight matrix includes determining, by the workload preprocessor, the first permuted weight matrix using the permutation process on the first plurality of dimension units;

determining, by the external computing device, a second permuted weight matrix using a matching permutation process on the second plurality of dimension units to match the reordering of the first plurality of dimension units;

wherein determining the second permuted weight matrix includes determining, by the workload preprocessor, the second permuted weight matrix using the matching permutation process on the second plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices.

73. The method of claim 72 wherein determining the plurality of weight matrices for the transformer workload operation includes determining the plurality of weight matrices from a computational graph representing a transformer workload.

74. A method of operating a transformer compute apparatus, the method comprising:

determining, by an external computing device, a plurality of weight matrices for a transformer workload operation, wherein the plurality of weight matrices includes at least a first weight matrix and a second weight matrix, wherein the first weight matrix includes a first plurality of dimension units, and wherein the second weight matrix includes a second plurality of dimension units and is used in a matrix multiplication operation with the first weight matrix;

wherein determining the plurality of weight matrices for the transformer workload operation includes determining the plurality of weight matrices from a computational graph representing a transformer workload;

determining, by the external computing device, a first permuted weight matrix using a permutation process on the first plurality of dimension units, wherein the permutation process includes reordering the first plurality of dimension units to reduce a variance of dimension unit vector norm values between adjacent dimension units;

determining, by the external computing device, a second permuted weight matrix using a matching permutation process on the second plurality of dimension units to match the reordering of the first plurality of dimension units;

transferring, by the external computing device, the first and the second permuted weight matrices to the transformer compute apparatus;

receiving, by an input buffer (IB) device of the transformer compute apparatus, a plurality of vector inputs;

wherein the IB device is coupled to a compute device and a crossbar device, a weight buffer (WB) device is coupled to the compute device and the crossbar device, an output buffer (OB) device is coupled to the compute device and the crossbar device, and a Single Instruction, Multiple Data (SIMD) device is coupled to the OB device;

receiving, by the WB device, at least the first and the second permuted weight matrices; and determining, by the compute device and the SIMD device, a plurality of transformer workload operation outputs using the plurality of vector inputs and the first and the second permuted weight matrices.

* * * * *